US012543730B2

(12) United States Patent
Kim et al.

(10) Patent No.: US 12,543,730 B2
(45) Date of Patent: Feb. 10, 2026

(54) CELLULOSE NANOCRYSTAL-BASED EMULSIONS AND USES THEREOF

(71) Applicant: Board of Trustees of the University of Arkansas, Little Rock, AR (US)

(72) Inventors: Jin-Woo Kim, Fayetteville, AR (US); Gurshagan Kandhola, Fayetteville, AR (US); Joseph Batta-Mpouma, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 0 days.

(21) Appl. No.: 18/673,405

(22) Filed: May 24, 2024

(65) Prior Publication Data

US 2024/0306636 A1 Sep. 19, 2024

Related U.S. Application Data

(62) Division of application No. 17/091,489, filed on Nov. 6, 2020, now abandoned.

(60) Provisional application No. 62/935,929, filed on Nov. 15, 2019.

(51) Int. Cl.

| | |
|---|---|
| ***A01N 25/04*** | (2006.01) |
| ***A01N 25/10*** | (2006.01) |
| ***A23D 7/005*** | (2006.01) |
| ***A23D 7/04*** | (2006.01) |
| ***A23L 5/30*** | (2016.01) |
| ***A23L 29/00*** | (2016.01) |
| ***A23L 29/10*** | (2016.01) |
| ***A61K 8/06*** | (2006.01) |
| ***A61K 8/73*** | (2006.01) |
| ***A61K 8/92*** | (2006.01) |
| ***A61K 9/107*** | (2006.01) |
| ***A61K 9/16*** | (2006.01) |
| ***A61K 47/44*** | (2017.01) |
| ***C08B 1/00*** | (2006.01) |
| ***C08B 3/24*** | (2006.01) |
| ***C09D 5/02*** | (2006.01) |
| ***C09D 101/10*** | (2006.01) |

(52) U.S. Cl.

CPC ............. *A01N 25/04* (2013.01); *A01N 25/10* (2013.01); *A23D 7/0053* (2013.01); *A23D 7/04* (2013.01); *A23L 5/32* (2016.08); *A23L 29/015* (2016.08); *A23L 29/10* (2016.08); *A61K 8/06* (2013.01); *A61K 8/731* (2013.01); *A61K 8/733* (2013.01); *A61K 8/922* (2013.01); *A61K 9/107* (2013.01); *A61K 9/1652* (2013.01); *A61K 47/44* (2013.01); *C08B 1/003* (2013.01); *C08B 3/24* (2013.01); *C09D 5/022* (2013.01); *C09D 101/10* (2013.01); *A23V 2002/00* (2013.01)

(58) Field of Classification Search

CPC ........ A01N 25/04; A01N 25/10; A01N 25/06; A01N 37/40; A23D 7/0053; A23D 7/04; A23L 5/32; A23L 29/015; A23L 29/10; A23L 29/262; A23L 35/10; A61K 8/06; A61K 8/731; A61K 8/733; A61K 8/922; A61K 9/107; A61K 9/1652; A61K 47/44; A61K 2800/10; A61K 2800/413; A61K 8/0245; C08B 1/003; C08B 3/24; C09D 5/022; C09D 101/10; A23V 2002/00; A61Q 19/00; C08L 1/04; C08L 5/04

See application file for complete search history.

(56) References Cited

U.S. PATENT DOCUMENTS

| | | | | |
|---|---|---|---|---|
| 10,207,252 | B2 | 2/2019 | Mohammed et al. | |
| 2011/0275599 | A1 * | 11/2011 | Voglewede ............ | A01N 25/00 514/355 |
| 2013/0122071 | A1 * | 5/2013 | Cathala ..................... | C08F 4/12 424/401 |
| 2016/0369121 | A1 | 12/2016 | Lapidot | |

FOREIGN PATENT DOCUMENTS

| | | | |
|---|---|---|---|
| CN | 108841015 | A | 11/2018 |
| JP | 55039710 | A | 3/1980 |
| WO | WO2009112836 | | 9/2009 |

OTHER PUBLICATIONS

Kalashnikova et al. Biomacromolecules. 2012; 13: 267-275. (Year: 2012).*

Golchoobi et al. J Texture Studies. 2016; 47(5): abstract. (Year: 2016).*

Badawy , et al., "Development and Characterization of Nanoemulsions of some Insecticides by High Energy Technique for Targeted Delivery", (J. Agric. Res. 2019, 57, 15-23).

(Continued)

*Primary Examiner* — David Browe

(74) *Attorney, Agent, or Firm* — Crowe & Dunlevy, P.C.

(57) ABSTRACT

This invention relates generally to a method of treating a crop with an agricultural product, where the method includes the steps of incorporating a cellulose nanocrystal-based emulsion into an agrochemical to produce the agricultural product and applying said agricultural product to said crop. The cellulose nanocrystal-based emulsion includes a continuous aqueous phase and a dispersed oil phase, where the continuous aqueous phase includes between about 0.25% and about 3% (w/w) of sulfonated cellulose nanocrystals, between about 0.25% and about 1% (w/w) of co-stabilizing biopolymer, and up to about 3.0% (w/w) of cationic crosslinker. The dispersed oil phase includes a plant-based oil.

14 Claims, 20 Drawing Sheets

(56) References Cited

OTHER PUBLICATIONS

Bai , et al., "Pickering emulsions by combining cellulose nanofibrils and nanocrystals: Phase behavior and depletion stabilization", (Green Chemistry, 2018, 20, 1571-1582).
Deng , et al., "Cellulose nanocrystals Pickering emulsion incorporated chitosan coatings for improving storability of postharvest Bartlett pears (*Pyrus communis*) during long-term cold storage", (Food Hydrocolloids 2018, 84, 229-237).
Du , et al., "Optimization and Characterization of Biocompactible Oil-in-Water Nanoemulsion for Pesticide Delivery", (ACS Sustainable Chem. Eng. 2016, 4, 983-991).
Fujisawa , et al., "Nanocellulose-stabilized Pickering emulsions and their applications", (Science and Technology of Advanced Materials, 2017,18, 959-971), 2017.
Gelski, Jeff, "Staking a Claim For Oleic Oils", Food Business News [online]; 2019; downloaded from <URL https://www.foodbusinessnews.net/articles/13459-staking-a-claim-for-oleic-oils> on Jul. 29, 2023; 3 pages. (Year:2019).
Hu , et al., "Dried and Redispersible Cellulose Nanocrystal Pickering Emulsions", (ACS Macro Letters 2016, 5, 185-189).
Jia , et al., "Adhesive Polydopamine Coated Avermectin Microcapsules for Prolonging Foliar Pesticide Retention", (ACS Applied. Materials Interfaces 2014, 6, 19552-19558).
Li , et al., "Lignin-Based Microsphere: Preparation and Performance on Encapsulating the Pesticide Avermectin", (ACS Sustainable Chem. Eng. 2017, 5, 3321-3328).
Lim , et al., "Physicochemical characterization and formation of glyphosate-laden nano-emulsion for herbicide formulation", (Industrial Crops and Products 2012, 36, 607-613).
Mikulcova , et al., "Pickering oil-in-water emulsions stabilized by carboxylated cellulose nanocrystals—Effect of the pH", (Food Hydrocolloids. 2018; 80: 60-67).
Shan , et al., "Sulfonate-Functionalized Mesoporous Silica Nanoparticles as Carriers for Controlled Herbicide Diquat Dibromide Release through Electrostatic Interaction", (Int. J. Mol. Sci. 2019, 20, 1330-1343).
Tang , et al., "Polydopamine microcapsules from cellulose nanocrystal stabilized Pickering emulsions for essential oil and pesticide encapsulation", (Colloids and Surfaces A: Physicochemical and Engineering Aspects 2019, 570, 403-413).
Varanasi , et al., "Pickering emulsions electrostatically stabilized by cellulose nanocrystals", (Frontiers in Chemistry 2018, 6, 1-9)., 2018.
Wibowo , et al., "Sustained Release of Fipronil Insecticide in Vitro and in Vivo from Biocompatible Silica Nanocapsules Electrostatic Interaction", (J. Agric. Food Chem. 2014, 62, 12504-12511).
Xu , et al., "Emulsion-based synchronous pesticide encapsulation and surface modification of mesoporous silica nanoparticles with carboxymethyl chitosan for controlled azoxystrobin release", (Chemical Engineering Journal 2018, 348, 244-254).
Yaakov , et al., "Single Cell Encapsulation via Pickering Emulsion for Biopesticide Applications", (ACS Omega 2018, 3, 14294-14301).
Golchoobi et al. J Texture Studies. 2016; 47(5): 1-10 (Year: 2016).

* cited by examiner

VMD (µm) = 285 ± 17 (M)

CELLULOSE NANOCRYSTAL-BASED EMULSIONS AND USES THEREOF

CROSS REFERENCE TO RELATED APPLICATIONS

This application is a divisional application of U.S. patent application Ser. No. 17/091,489 filed on Nov. 6, 2020, which claims the benefit of U.S. Provisional Patent Application No. 62/935,929 filed on Nov. 15, 2019, and incorporates the foregoing applications by reference in their entirety into this document as if fully set out at this point.

GOVERNMENT LICENSE RIGHTS

This invention was made with U.S. Government support under OIA-1457888 awarded by the National Science Foundation (NSF). The Government has certain rights in this invention.

BACKGROUND OF THE INVENTION

1. Field of the Invention

This invention relates generally to cellulose nanocrystal-based emulsions and use thereof, including without limitation, in agriculture, food, cosmetic, paint, coating, and pharmaceutical applications.

2. Description of the Related Art

Global crop production suffers considerably due to inefficient application of pesticides, resulting from their volatilization, degradation, and leaching. A pressing problem that has been a hot topic in recent years and needs urgent attention is the drift of agrochemicals. Pesticide drift is defined as the unintended movement of spray droplets from a target area of application to undesired sites, which has serious health, environmental and economic consequences. It can result in significant damage to sensitive crops such as non-genetically modified soybean and cotton, tomatoes, peaches, hemp, etc., raise operational costs to farmers, and put licenses of applicators (both ground and aerial) and organic crop growers in jeopardy.

There are two types of drift: particle drift and vapor drift. Particle drift is the physical movement of spray droplets from a target site during application, and droplet size is the most important factor that affects particle drift. Vapor drift occurs due to the volatilization of spray droplets and can happen for several days after application. Volatile pesticides are most prone to vapor drift.

Advancements in nozzle technologies and adoption of best spraying practices have led to significant improvements in reduction of particle drift. For example, spraying at the right time by monitoring wind direction and speed, temperature and humidity conditions, and using the right nozzles with appropriate spacing, angle, pressure, volume, application rate and boom height, are factors that help control particle drift via better management of spray droplet size distribution. Most commercial drift reduction control adjuvants on the market today are for particle drift mitigation, but these often end up being detrimental to the efficacy of the agrochemical or creating more stress to the environment. Few commercial adjuvants that control vapor drift are available on the market today and there is a dire need to improve the effectiveness of agrochemical formulations in minimizing vapor drift, especially when it comes to the widely used but highly volatile active ingredient chemistries, such as dicamba and 2,4-D.

Inert materials, called adjuvants, are typically added to commercial pesticide active ingredient formulations and to spray mixtures to improve the biological performance, reduce their surface tension, and improve the efficacy of agrochemicals through better spread and penetration of the spray mix. However, profound problems facing the agricultural industry are the solubility and toxicity of adjuvants. Most adjuvants used today are synthetic (e.g., organosilicates and polyoxyethylene amine) or petroleum-derived (e.g., alkylphenol ethoxylates) polymers, and other volatile organic solvents; moreover, surfactants can be highly toxic to bee populations and aquatic animals, can cause human health problems, environmental, soil, and water pollution and result in significant crop damage from cross-contamination.

With an increasing interest in eco-friendly solutions, it is therefore desirable to replace existing toxic and volatile organic surfactants with non-toxic, biobased, and biodegradable adjuvants that can stabilize oil-in-water emulsions and improve the efficacy of the pesticide spray mixture.

Before proceeding to a detailed description of the invention, however, it should be noted and remembered that the description of the invention which follows, together with the accompanying drawings, should not be construed as limiting the invention to the examples (or embodiments) shown and described. Those skilled in the art to which the invention pertains will be able to devise other forms of this invention within the ambit of the appended claims.

SUMMARY OF THE INVENTION

In general, in a first aspect, the invention relates to a cellulose nanocrystal-based emulsion. The emulsion comprises a continuous aqueous phase having between about 0.25% and about 3% (w/w) sulfonated cellulose nanocrystals, between about 0.25% and about 1% (w/w) of a co-stabilizing biopolymer, and up to about 3.0% (w/w) of a cationic crosslinker. The emulsion further comprises a dispersed oil phase having a plant-based oil.

The sulfonated cellulose nanocrystals in the cellulose nanocrystal-based emulsion can be pristine and/or functionalized cellulose nanocrystals. The co-stabilizing biopolymer in the cellulose nanocrystal-based emulsion can be alginate, chitosan, starch, derivatized and nanofibrillated cellulose, collagen, lignin, hydroxyapatite, cyclodextrin, guar gum, carrageenan, silk, or a combination thereof. The cationic crosslinker facilitates ionic crosslinking between the two polymers that can be calcium chloride ($CaCl_2$)) or any other salt containing divalent or trivalent cations (e.g., $Ba^{2+}$, $Mg^{2+}$, $Zn^{2+}$, $Mn^{2+}$, $Cu^{2+}$, $Fe^{3+}$, $Al^{3+}$, $Au^{3+}$, etc.). The plant-based oil can be oleic acid, crop oil, methylated seed oil, essential oils, sunflower oil, coconut oil, canola oil, neem oil, soybean oil, cottonseed oil or a combination thereof. The cellulose nanocrystal-based emulsion can be incorporated into formulations of agricultural, food, cosmetic, paint, coating and/or pharmaceutical products, specifically including without limitation agrochemicals, such as pesticides, fungicides, insecticides, herbicides, or a combination thereof. The cellulose nanocrystal-based emulsion can have a water-to-oil ratio of about 70:30 v/v to about 90:10 v/v.

In general, in a second aspect, the invention relates to a method of producing a cellulose nanocrystal-based emulsion. The method includes the step of producing the said sulfonated cellulose nanocrystals, from raw materials such as microcrystalline cellulose or wood-derived cellulose pulp, using sulfuric acid hydrolysis. The method also includes the step of producing the cellulose nanocrystal-based emulsion by sonication, more particularly sonicating the emulsion for a predetermined time and a predetermined number of cycles using a probe sonicator at a predetermined power output.

In general, in a third aspect, the invention relates to a method of using a cellulose nanocrystal-based emulsion for reducing particle and vapor drift of an agrochemical. The method includes the steps of incorporating the cellulose nanocrystal-based emulsion into the agrochemical and applying the agrochemical to a crop. The method can also include the step of selectively tuning the droplet size distribution of the cellulose nanocrystal-based emulsion.

The cellulose nanocrystal-based emulsion provides both surfactant and drift-control functionalities in a single formulation, and advantageously stabilizes and improves the efficacy of agrochemical spray mixtures. Another advantage of using the cellulose nanocrystal-based emulsion as adjuvants to agrochemicals is that they are relatively stable once made and are compatible with both hydrophilic and hydrophobic active ingredients. The cellulose nanocrystal-based emulsion provided herein uses plant-based, non-toxic, and biodegradable materials that can substitute currently used synthetic and/or petroleum-derived surfactants and drift control adjuvants that harm the environment. Moreover, cellulose nanocrystal-based emulsions serve to reduce both particle drift and vapor drift, which is a significant unsolved problem in the agricultural sector. The stable crosslinked structural network minimizes small and fine spray droplet formation and encapsulates volatile agrochemicals, thus preventing off-target movement of agrochemical particles. The cellulose nanocrystal-based emulsion can directly be applied to diluted mixtures of commercial pesticide and herbicide formulations by applicators when they prepare the spray mix, or these can also be used by agrochemical companies to encapsulate their active ingredients and manufacture/sell as part of their commercial formulation, thus preventing an additional step for the applicator.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
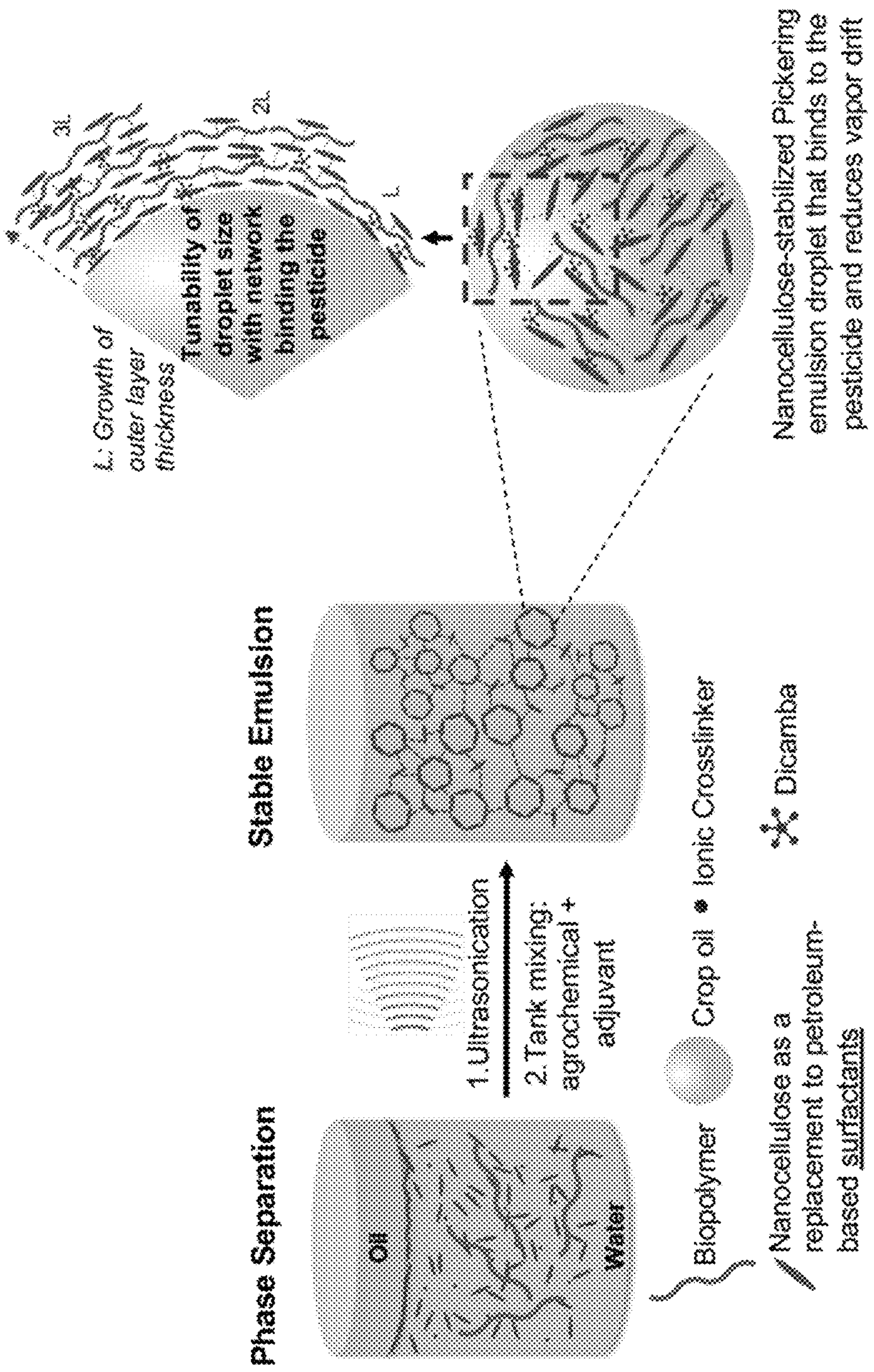
FIG. 1 is a schematic illustration of an exemplary process of preparing a cellulose nanocrystal-based emulsion and its tunability in terms of outer layer growth of the droplets in the emulsion in accordance with an illustrative embodiment of the invention disclosed herein.

While this invention is susceptible of embodiment in many different forms, there are shown in the drawings, and will herein be described hereinafter in detail, some specific embodiments of the instant invention. It should be understood, however, that the present disclosure is to be considered an exemplification of the principles of the invention and is not intended to limit the invention to the specific embodiments so described.

The invention relates generally to cellulose nanocrystal-based emulsions and uses thereof in agriculture and agrochemicals. More particularly, the cellulose nanocrystal-based emulsions are cellulose nanocrystal (CNC) (pristine and functionalized) based Pickering emulsions for encapsulating active agrochemical ingredients. The interaction of a CNC-based network with agrochemicals improves their performance and efficacy and reduces particle and vapor drift. The invention further relates to methods of preparing Pickering emulsions stabilized by cellulose nanocrystals and the use of the emulsions as surfactants and defoaming or water conditioning agents in the preparation of tank mix and application of pesticides on crops.

The CNC-based emulsions include a continuous aqueous phase containing sulfonated CNC as colloidal particles and a co-stabilizing biopolymer. A cationic crosslinker in the aqueous phase to facilitate ionic crosslinking between the CNC and the co-stabilizing biopolymer in the aqueous phase. A dispersed oil phase contains a plant-based oil (e.g., oleic acid). The CNC-based emulsions are suitable surfactants and drift-reducing adjuvants for agrochemicals. The sulfonated CNCs as colloidal particles provide surfactant, water conditioning, and shear-thinning properties and improve spray deposition by reducing surface tension and minimizing foaming. Alginate as the co-stabilizing biopolymer acts as a solution thickener and drift-control additive, that reduces spray drift by increasing viscoelasticity and maximizing large spray droplet size formation.

CNCs, derived from acid hydrolysis of microcrystalline cellulose or cellulose pulp derived from lignocellulosic biomass, are plant-based, non-toxic and biodegradable nanoparticles that have the ability to form Pickering emulsions. Lignocellulosic biomass includes wood based raw materials, both hardwoods and softwoods, or agricultural residues, such as wheat straw, rice straw, corn stover, etc. CNCs are rod-like structures with diameters in the range of 10-20 nm and lengths in the range of 100-500 nm. CNCs have a hydroxyl-rich surface and an alkyl end that makes them amphiphilic, i.e., having both hydrophilic and hydrophobic properties. CNCs have unique physicochemical properties, and the physical characteristics of CNCs can be tuned depending on the treatment conditions and the source of cellulose. Moreover, their hydrophobicity can be tuned by altering their surface chemistry with different functional groups. The amphiphilic characteristics of CNCs make them an ideal candidate to be used as solid emulsifiers and replace traditional liquid surfactants in pesticide formulations and spray mixtures. CNCs serve not only as a biocompatible alternative to synthetic surfactants, but also as a key element in the formation of the matrix network. CNCs self-assemble and lay at the interface of oil and water and contribute either partially or wholly to the formation of droplets in the emulsion by stabilizing the structure via physical and chemical forces.

The co-stabilizing biopolymer of the cellulose nanocrystal-based emulsions can be alginate, which is a hydrophilic and anionic polysaccharide extracted from seaweed. Alginate is an FDA approved emulsifier, stabilizer, and thickener, and is commercially used in food, cosmetic and pharmaceutical applications. Alternatively, the emulsion droplets can be co-stabilized using other crosslinkable biopolymers, including but not limited to chitosan, starch, derivatized and nanofibrillated cellulose, collagen, lignin, hydroxyapatite, cyclodextrin, guar gum, carrageenan, and silk.

The aqueous phase of the cellulose nanocrystal-based emulsions also includes the cationic crosslinker to facilitate ionic crosslinking between individual cellulose nanoparticles and the co-stabilizing biopolymer. The cationic crosslinker is used to aid the formation of a stable crosslinked network that leads to reduction in active ingredient volatilization and hence vapor drift. The cationic crosslinker can be calcium chloride, but $Ca^{2+}$ used as the model cation crosslinker can be substituted with other divalent and trivalent cations, including but not limited to $Ba^{2+}$, $Mg^{2+}$, $Zn^{2+}$, $Mn^{2+}$, $Cu^{2+}$, $Fe^{3+}$, $Al^{3+}$, $Au^{3+}$, and other alkaline or transition metal ions.

The plant-based oil can be oleic acid or can be replaced with other plant-based oils, including but not limited to crop oil, methylated seed oil, essential oils and plant-based oils with pesticidal properties, such as sunflower oil, coconut oil, canola oil, neem oil, soybean oil and cottonseed oil.

The cellulose nanocrystal-based emulsions can include a continuous aqueous phase having 0.25%-3% (w/w) CNC as a solid emulsifier and 0.25%-1% (w/w) sodium alginate to improve the density of the emulsion. $CaCl_2$), up to 0.5% (w/w) equivalent to 5 mM, is added to the mixture to create a stable network of CNCs and alginate that efficiently resists coalescence. In another embodiment, emulsions containing only CNC and/or nanofibrillated cellulose without alginate can be formed with salt concentration in the range of 5-30 mM. Calcium ions act as a non-covalent crosslinker to stabilize the network structure formation. The continuous aqueous phase may include all forms of functionalized and chemically modified CNCs, biopolymers and other types of divalent and trivalent cations. The oil phase includes oleic acid, and the dispersed oil phase was employed to meet a combination of 70:30, 80:20 or 90:10 v/v for a water-to-oil ratio.

The cellulose nanocrystal-based emulsions can be prepared using an ultrasonicator with a process time ranging from few seconds to few minutes, depending on the energy/power of the ultrasonicator. The size of the emulsion droplet can be tuned by varying the concentration of CNC, biopolymer, or ionic crosslinker, as well as the power and process time used to make the emulsions. The oil-water cellulose nanocrystal-based emulsions, prepared using ultrasonication, can be used with both hydrophilic and hydrophobic active ingredient chemistries. CNC-based Pickering emulsions were co-stabilized by a matrix of crosslinked alginate to facilitate encapsulating agrochemicals, e.g., pesticides, fungicides, insecticides, and herbicides. Not only do the cellulose nanocrystal-based emulsions minimize fine droplet formation and reduce particle drift, but they also prevent the volatilization of the agrochemical, thus facilitating overall application efficiency in a single-step process.

Examples

The cellulose nanocrystal-based emulsions and processes for formulating the same are further illustrated by the following examples, which are provided for the purpose of demonstration rather than limitation.

Example 1: Synthesis and Characteristics of Cellulosic Nanomaterials Used

Sulfonated cellulose nanocrystals (CNCs) were prepared from microcrystalline cellulose using strong acid hydrolysis under conditions ranging between 50-64% (w/w) sulfuric acid, 45-60° C. and 30-60 min. Colloidal aqueous suspensions of ~2% (w/w) concentration were obtained. CNC particles had the following properties: length ranging between about 100 nm to about 200 nm; width ranging between about 10 nm and about 30 nm, with an aspect ratio ranging between about 5 and about 20; polydispersity index ranging between about 0.3 and about 0.5; and zeta-potential of at least about-30 mV. In another embodiment, CNCs can be substituted by nanofibrillated cellulose, i.e., cellulose nanofibers (CNFs), as well as other forms of surface functionalized CNCs and CNFs.

Example 2: Process of Mixing with all Components

The aqueous phase, containing 5 mM calcium chloride, consisted of CNCs diluted to three concentrations (0.25%, 0.5% and 1% w/w). Each CNC concentration was tested with three different concentrations of alginate (0.25%, 0.5% and 1% w/w). Sodium alginate was added to the CNC suspension and allowed to gradually dissolve in the aqueous phase. Once fully dissolved, oleic acid (as model oil) was added in a 90:10 (v/v) (water:oil) ratio, and the ratio could be tuned to 80:20 and 70:30.

Example 3: Process of Forming an Emulsion Using Ultrasonication

As shown on FIG. 1, the formulations were ultrasonicated with a probe sonicator. FIG. 1 is a schematic illustration of an exemplary process of preparing a cellulose nanocrystal-based emulsion and its tunability in terms of outer layer growth of the droplets in the emulsion in accordance with an illustrative embodiment of the invention disclosed herein. Emulsions of 5 ml containing different combinations of oil and water phases were obtained upon the process. The mixture was emulsified using a probe sonicator during two cycles of 20 seconds [3 seconds on, 2 seconds off] in an intensity level of 40%.

Figure 2A:
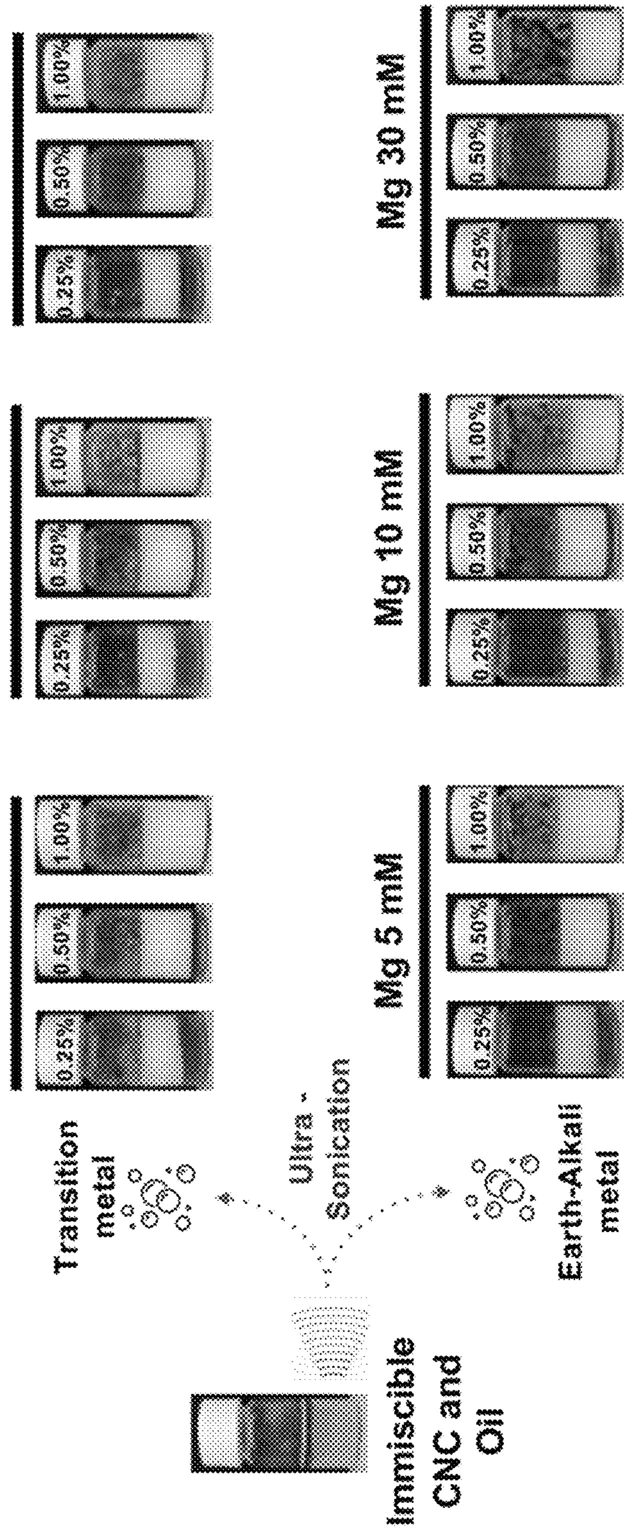
FIG. 2A is a visual representation of the surfactant effect of cellulose nanocrystal (CNC) in stabilizing the emulsion without the use of any additive surfactants, at different concentrations of alkaline ($Mg^{2+}$) and transition ($Zn^{2+}$) metals. Visual observation shows that increasing concentration of CNC enhances emulsion stability.
Figure 2B:
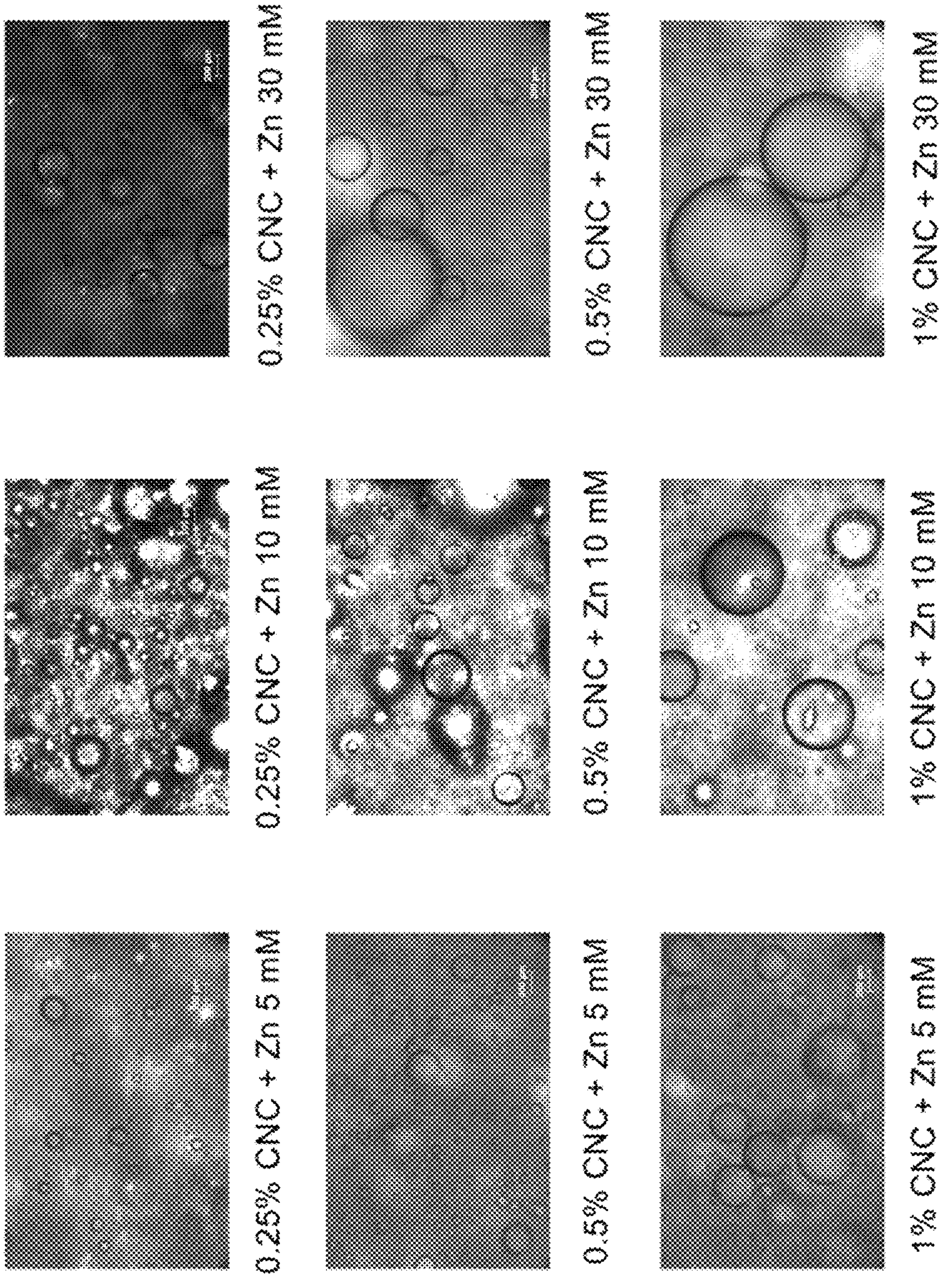
FIG. 2B consists of optical microscopic images of cellulose nanocrystal-stabilized Pickering emulsion droplets where the aqueous phase is made of CNC alone, crosslinked with a transition metal ion ($Zn^{2+}$).
Figure 2C:
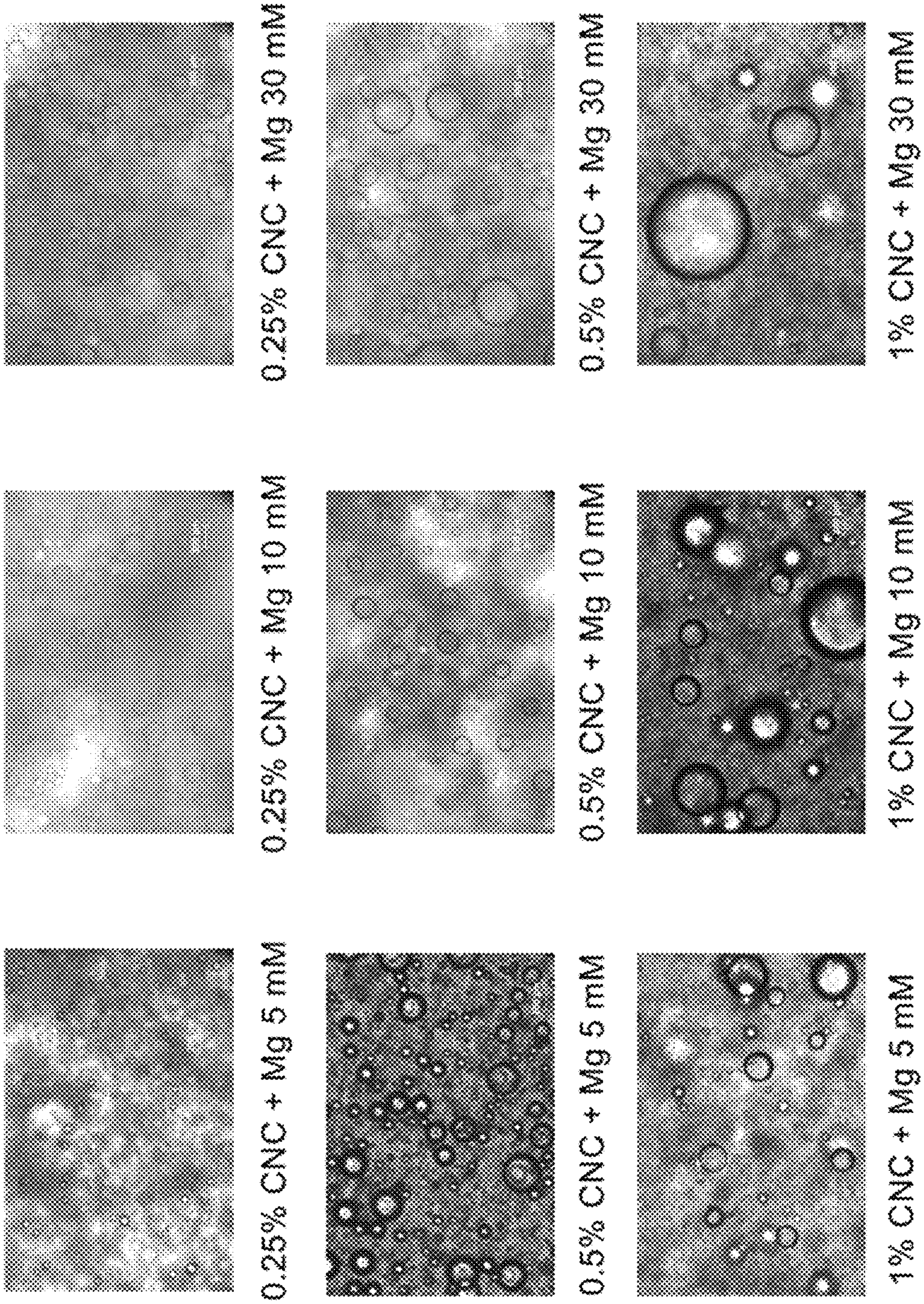
FIG. 2C consists of optical microscopic images of cellulose nanocrystal-stabilized Pickering emulsion droplets where the aqueous phase is made of CNC alone, crosslinked with an alkaline metal ion ($Mg^{2+}$).

The formation of emulsions was validated using visual observation of the mixture in glass vials and optical microscopy images on concave glass slides. FIG. 2 is the mixture representation and emulsion droplet images of cellulose nanocrystal-stabilized Pickering emulsions, at different concentrations of CNCs and cationic crosslinker. FIG. 2A shows CNC-based emulsion samples prepared by addition of alkaline ($Mg^{2+}$) and transition ($Zn^{2+}$) metal crosslinkers at different concentrations (5 mM to 30 mM). Overall, the visual observation of the emulsion formation was validated by the incremental miscibility of the oil phase and aqueous phase as the concentration of CNC. Before the ultrasonication process, oil occupies the upper layer of the sample, signifying a mixture of two immiscible liquid phases. After emulsification, oil droplets are uniformly dispersed throughout the aqueous phase as sulfonated CNCs adsorbed onto the oil-water interface to make a stable emulsion, indicating the surfactant property of CNCs. As shown in FIG. 2B and FIG. 2C, the visual observation was aligned with the formation of microemulsion as investigated using concave microscope slides and an inverted optical microscope. The emulsion droplet size increased with increasing concentrations of CNCs at constant ionic crosslinker concentrations, confirming that CNCs had an effect not only on the droplet size, but also on the stability of the emulsions.

Figure 3A:
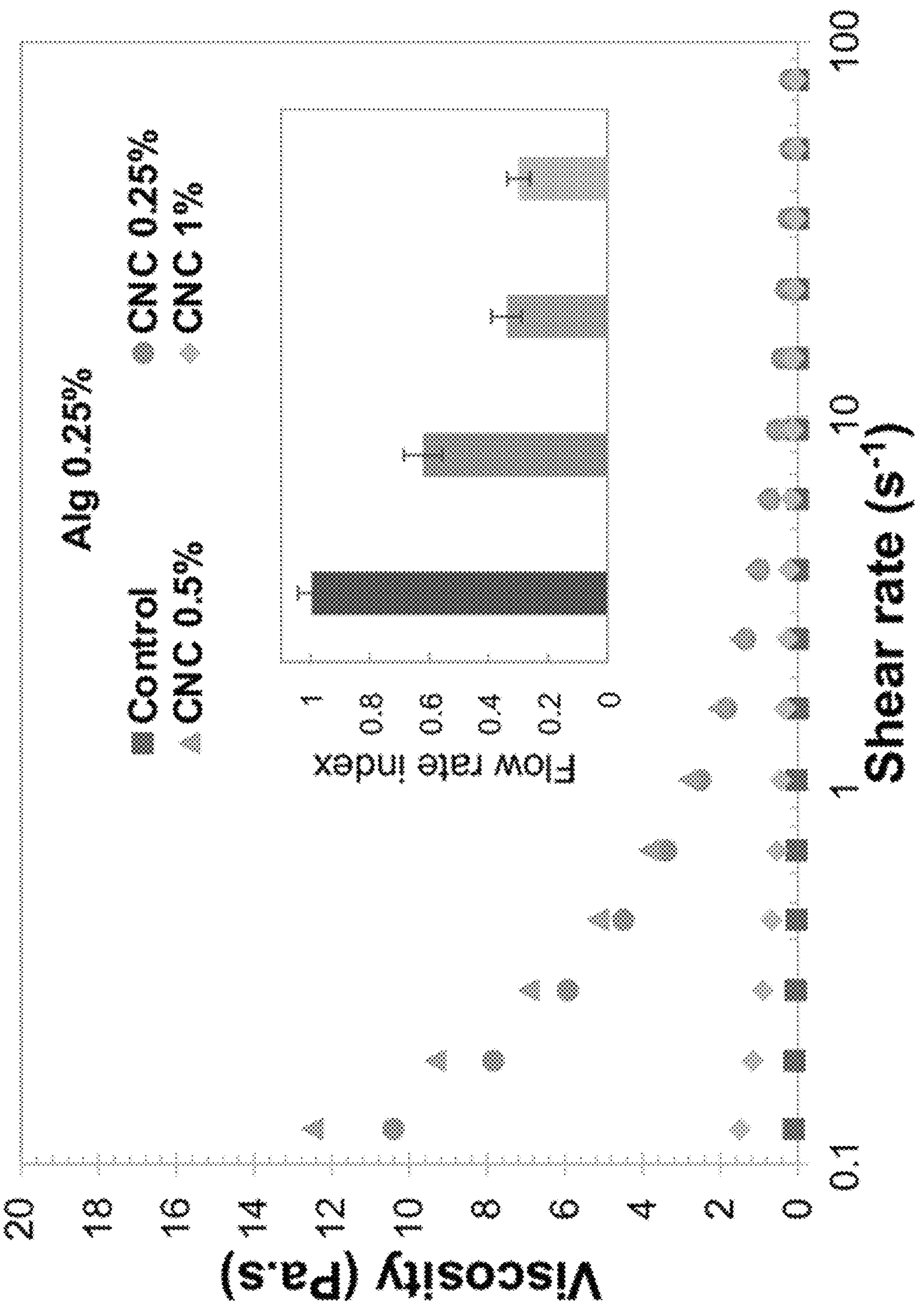
FIG. 3A is a graphical representation illustrating rheology tests using a rheometer with parallel plate, where the flow ramp shows that varied flow behavior of emulsion is dependent on the interaction between the co-stabilizing biopolymer, e.g., 0.25% alginate (Alg), and CNC, suggesting the ability to increase the viscosity of the emulsion without compromising its fluid flow behavior.
Figure 3B:
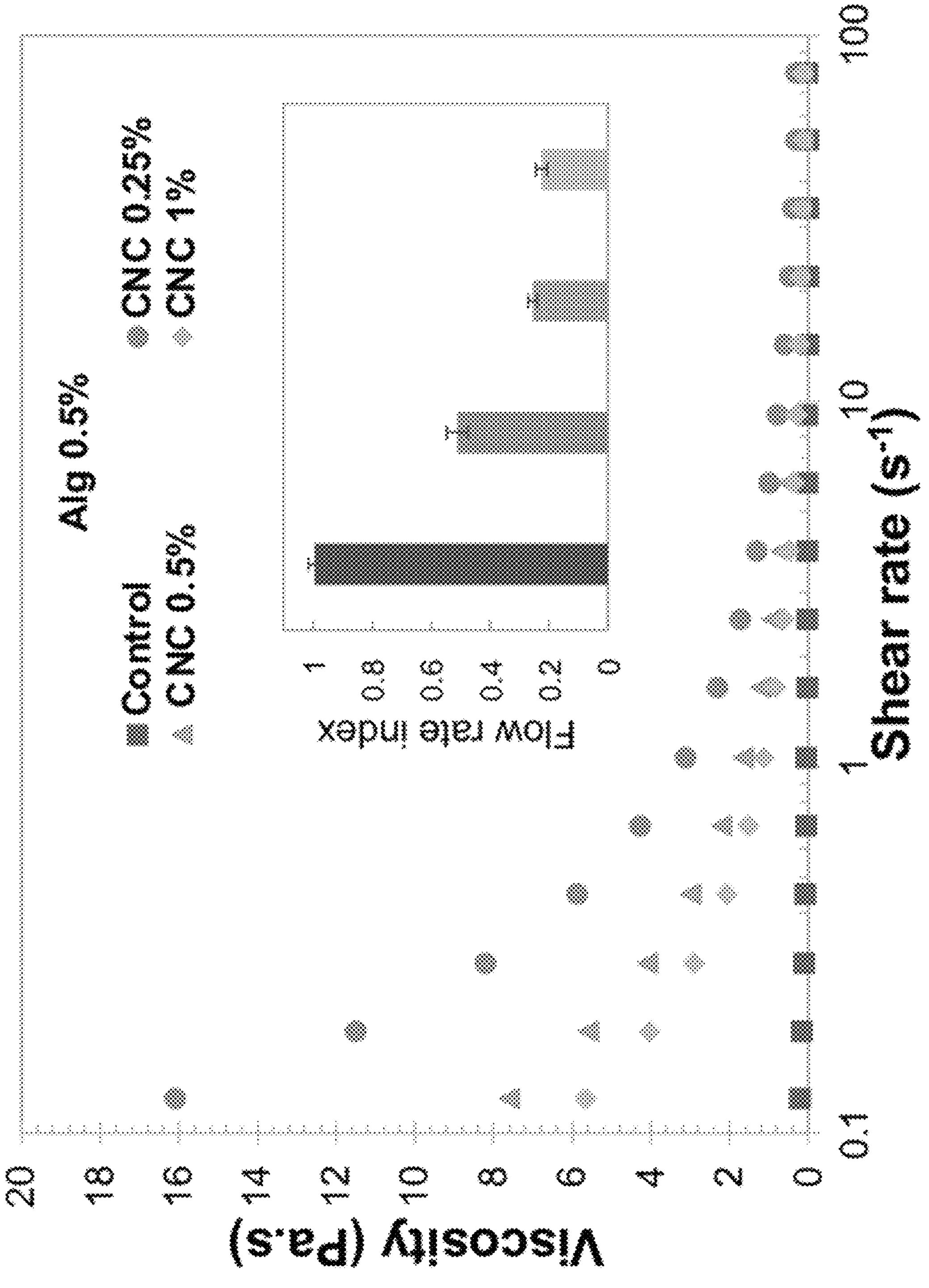
FIG. 3B is a graphical representation illustrating rheology tests using a rheometer with parallel plate, where the flow ramp shows that varied flow behavior of emulsion is dependent on the interaction between the co-stabilizing biopolymer, e.g., 0.5% alginate (Alg), and CNC, suggesting the ability to increase the viscosity of the emulsion without compromising its fluid flow behavior.
Figure 3C:
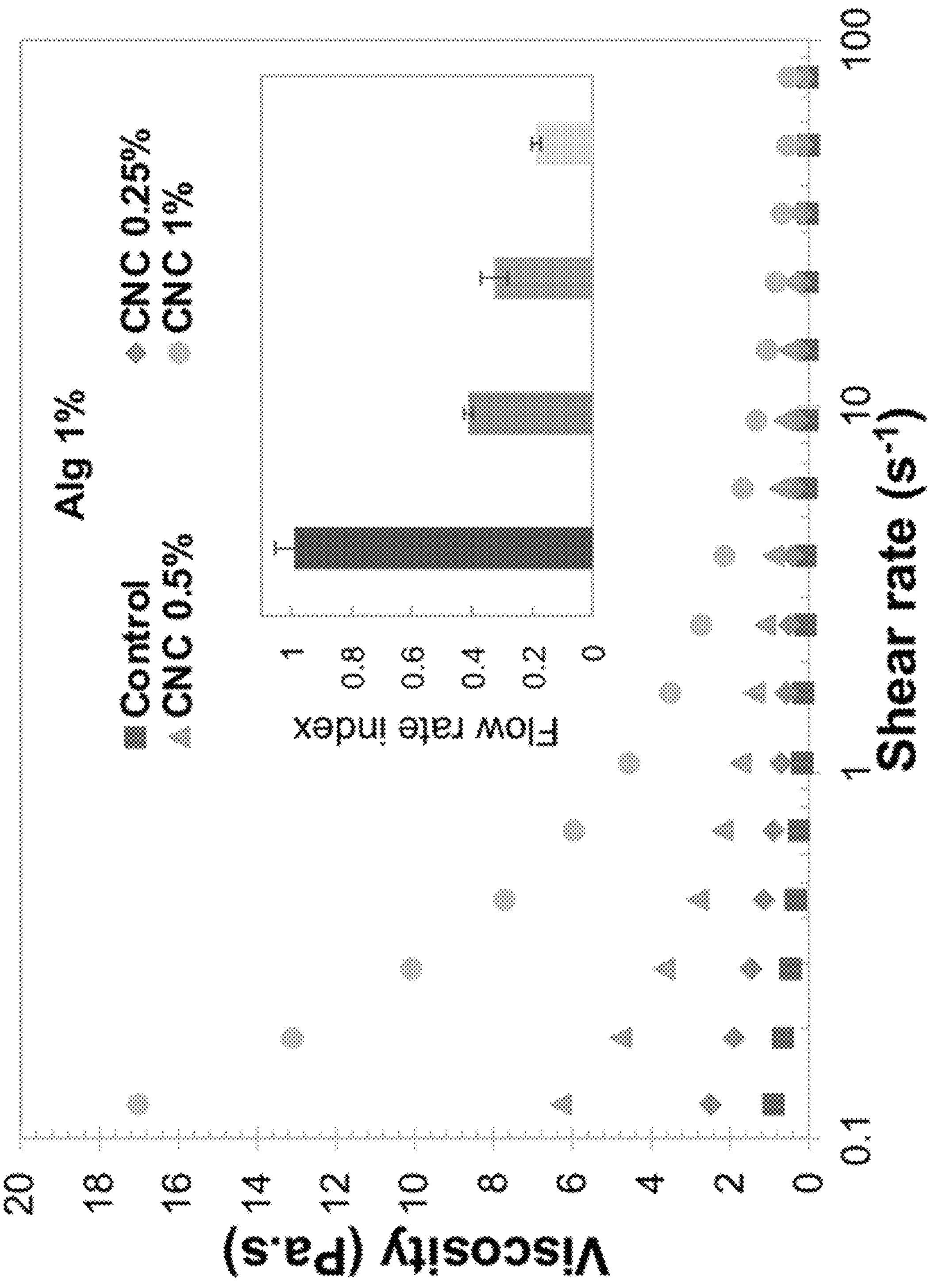
FIG. 3C is a graphical representation illustrating rheology tests using a rheometer with parallel plate, where the flow ramp shows that varied flow behavior of emulsion is dependent on the interaction between the co-stabilizing biopolymer, e.g., 1% alginate (Alg), and CNC, suggesting the ability to increase the viscosity of the emulsion without compromising its fluid flow behavior.
Figure 4A:
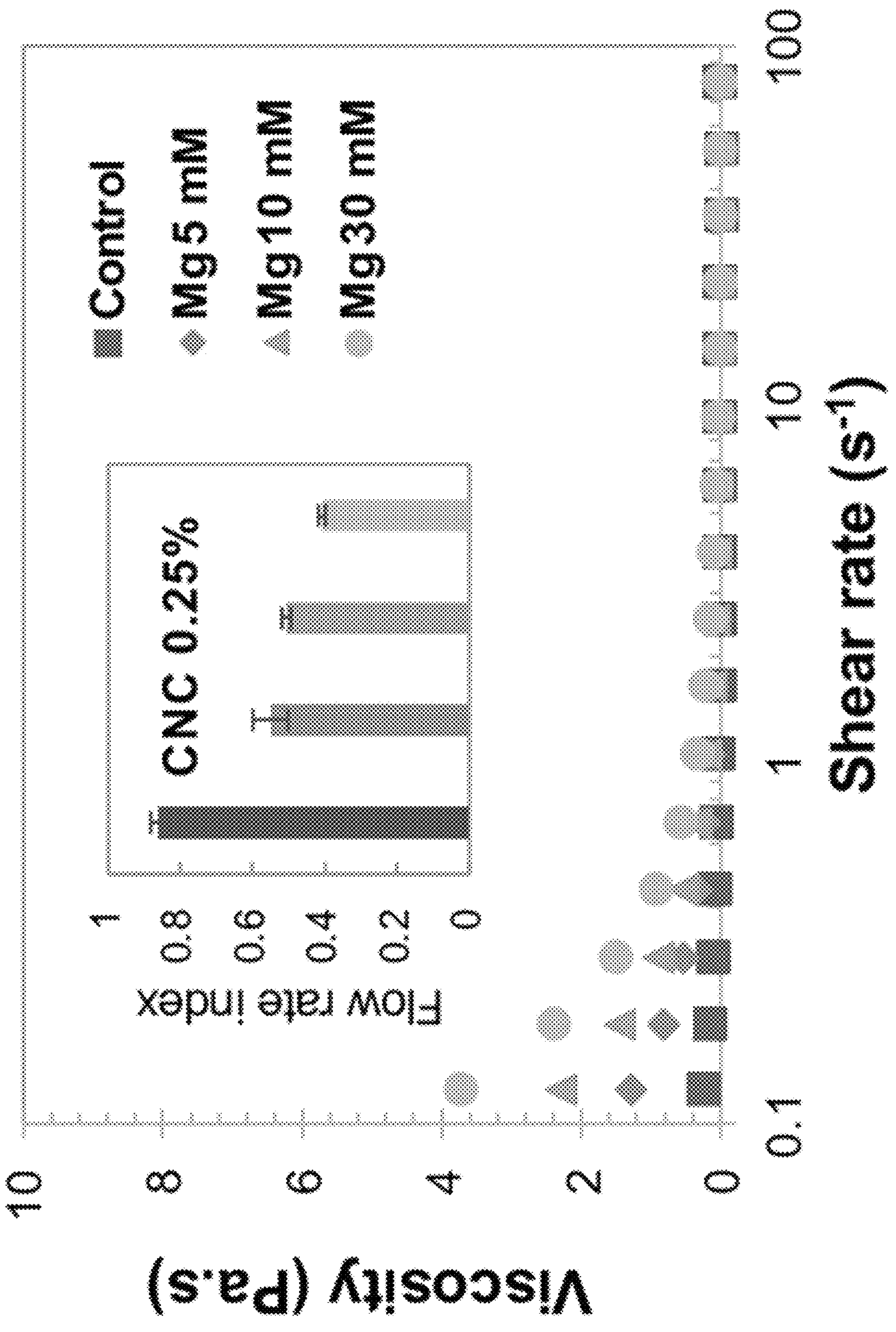
FIG. 4A is a graphical representation illustrating rheology tests using a rheometer with parallel plate, where the flow ramp shows that varied flow behavior of emulsion is dependent on the concentration of CNC (0.25%) and cationic crosslinker (5, 10 and 30 mM $Mg^{2+}$).
Figure 4B:
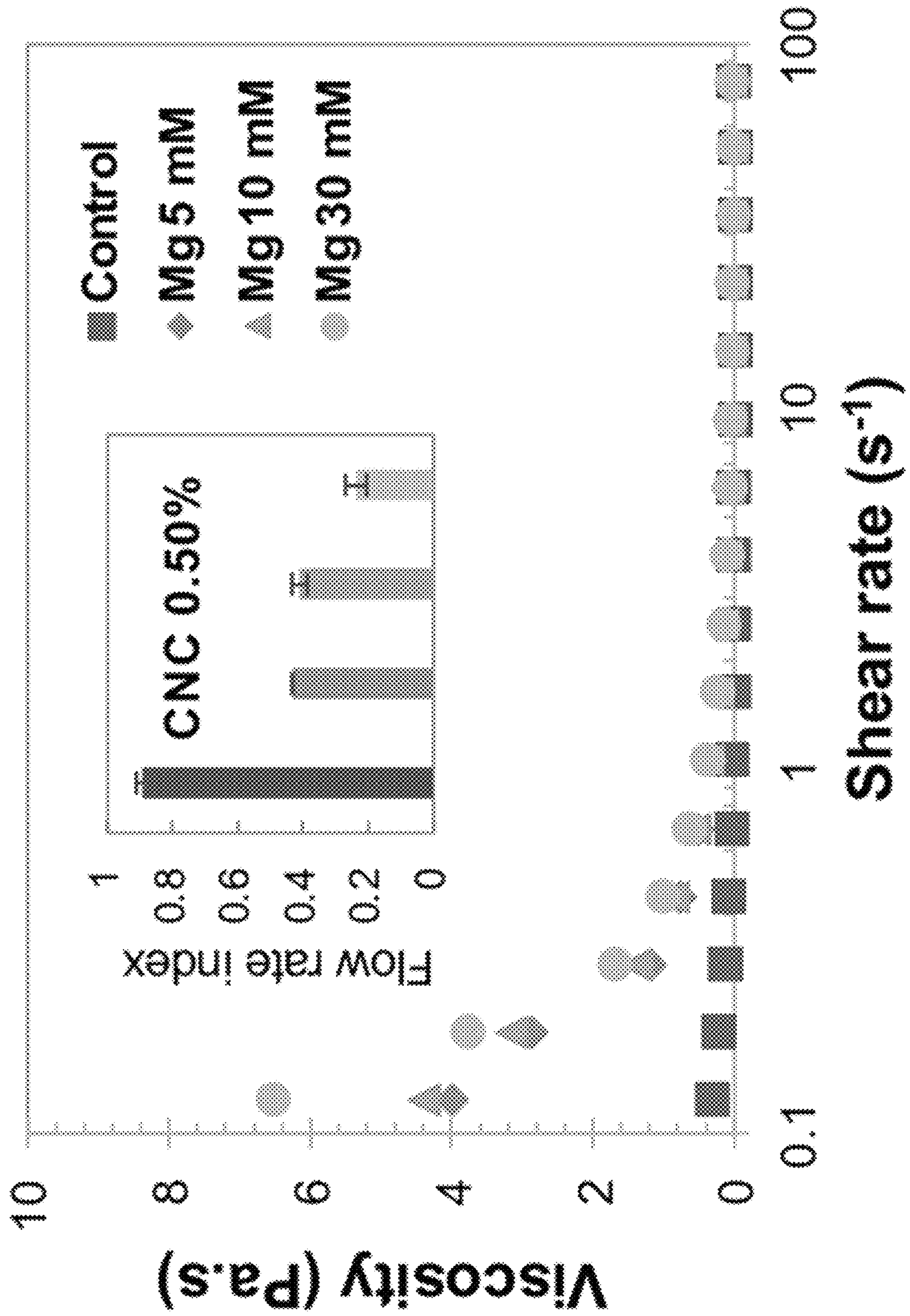
FIG. 4B is a graphical representation illustrating rheology tests using a rheometer with parallel plate, where the flow ramp shows that varied flow behavior of emulsion is dependent on the concentration of CNC (0.50%) and cationic crosslinker (5, 10 and 30 mM $Mg^{2+}$).
Figure 4C:
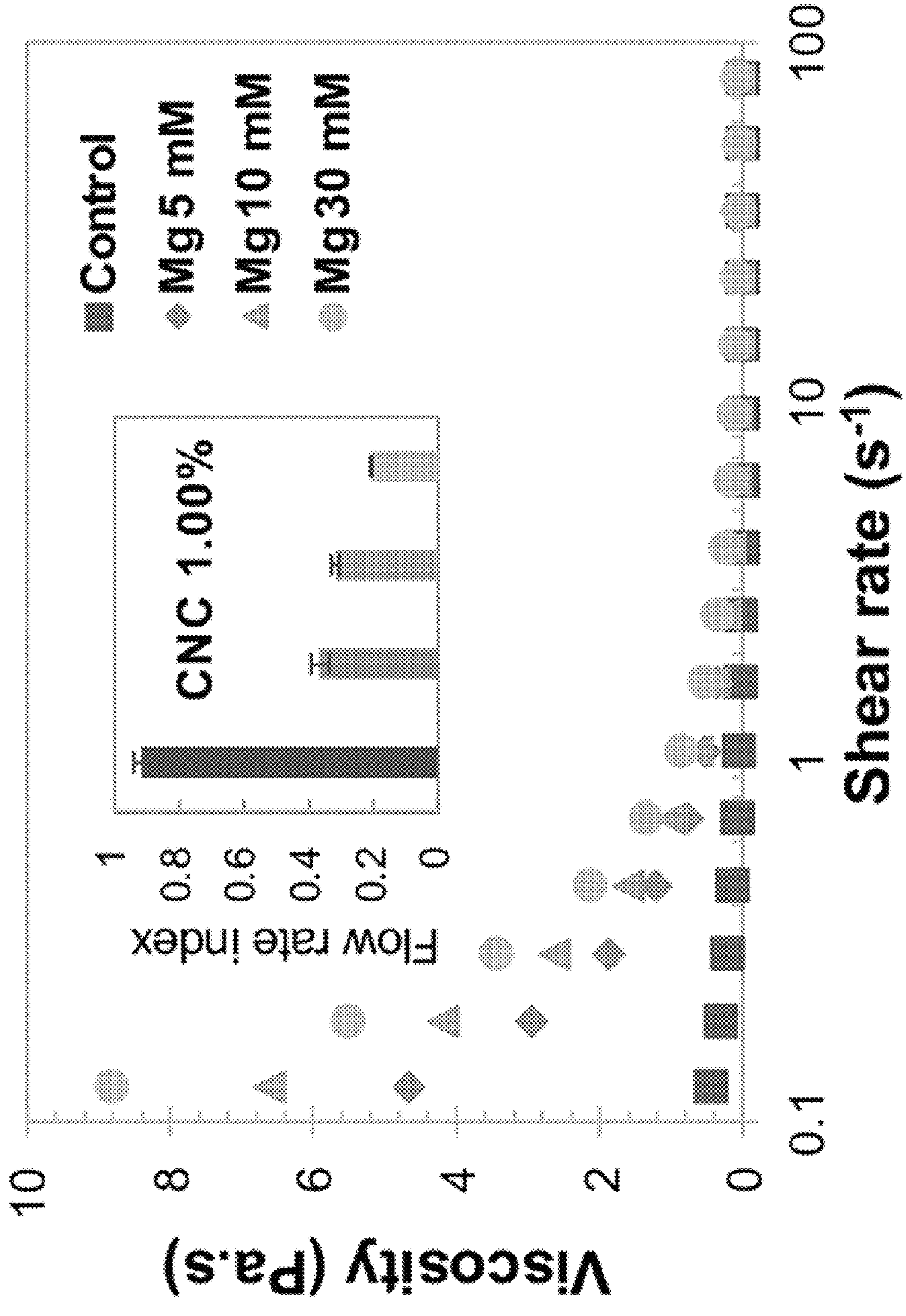
FIG. 4C is a graphical representation illustrating rheology tests using a rheometer with parallel plate, where the flow ramp shows that varied flow behavior of emulsion is dependent on the concentration of CNC (1.00%) and cationic crosslinker (5, 10 and 30 mM $Mg^{2+}$).
Figure 4D:
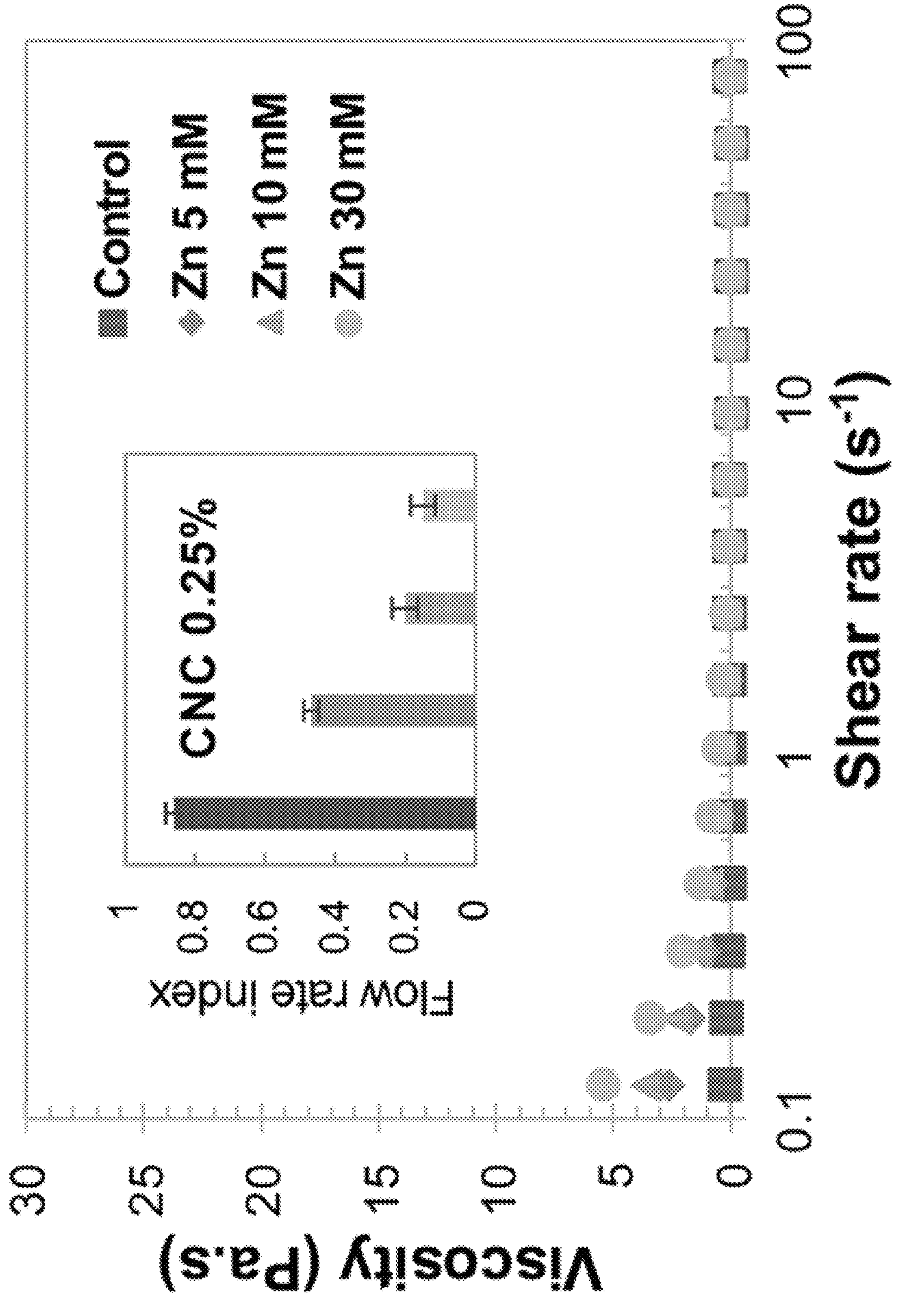
FIG. 4D is a graphical representation illustrating rheology tests using a rheometer with parallel plate, where the flow ramp shows that varied flow behavior of emulsion is dependent on the concentration of CNC (0.25%) and cationic crosslinker (5, 10 and 30 mM $Zn^{2+}$).
Figure 4E:
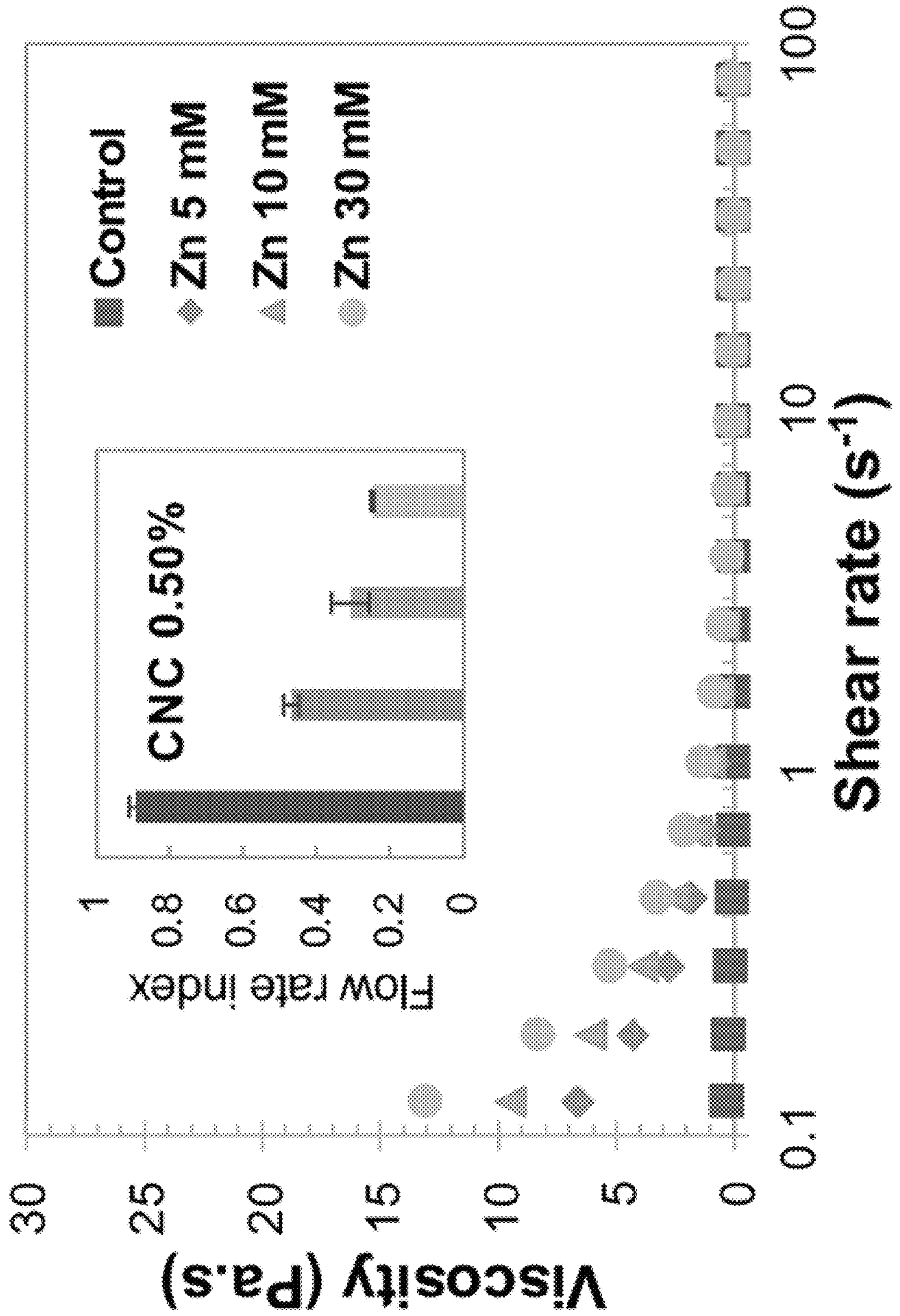
FIG. 4E is a graphical representation illustrating rheology tests using a rheometer with parallel plate, where the flow ramp shows that varied flow behavior of emulsion is dependent on the concentration of CNC (0.50%) and cationic crosslinker (5, 10 and 30 mM $Zn^{2+}$).
Figure 4F:
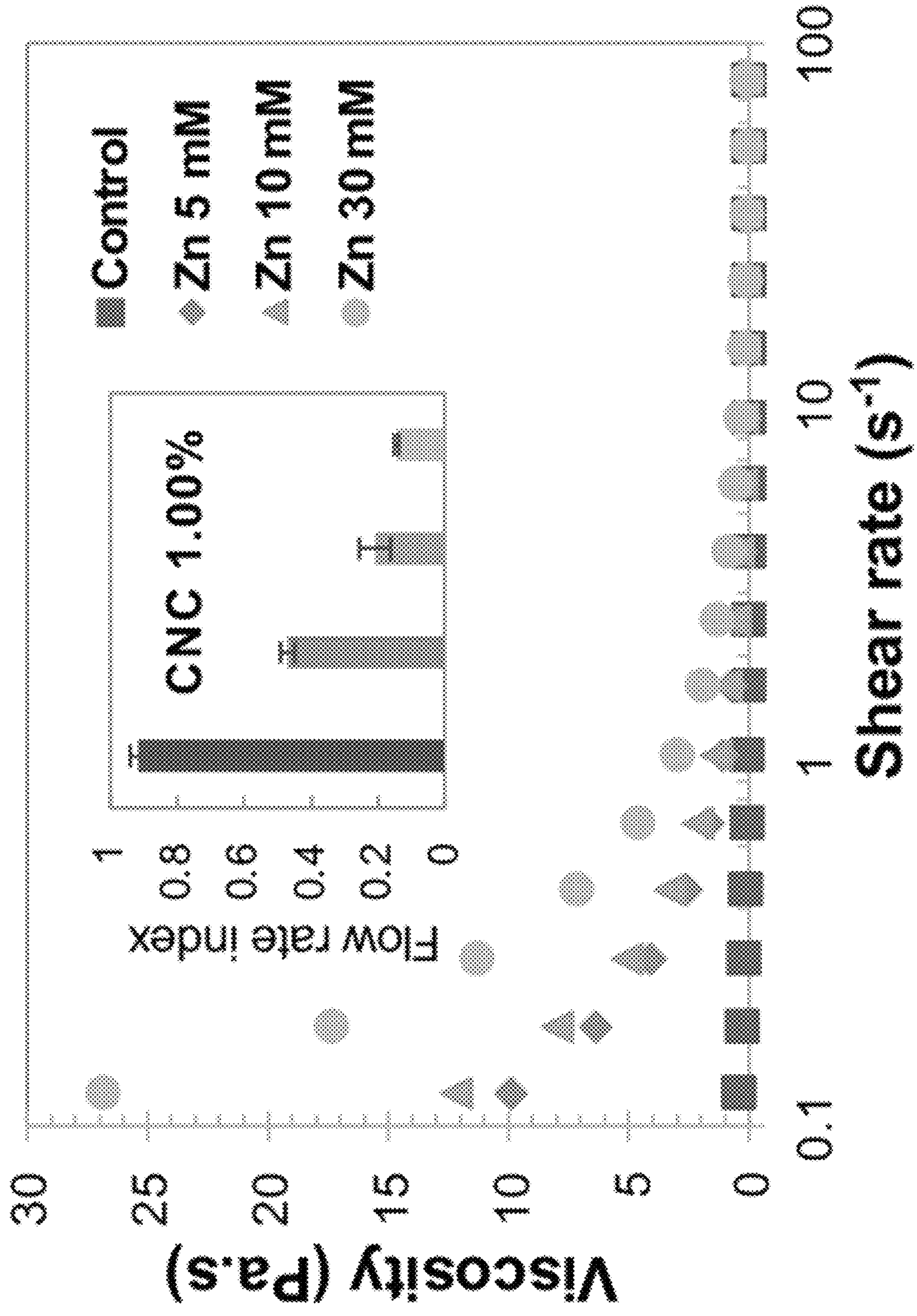
FIG. 4F is a graphical representation illustrating rheology tests using a rheometer with parallel plate, where the flow ramp shows that varied flow behavior of emulsion is dependent on the concentration of CNC (1.00%) and cationic crosslinker (5, 10 and 30 mM $Zn^{2+}$).

The formed emulsions were tested for different properties, including structural and shear flow behavior, as well as surface and chemical characteristics. FIGS. 3A-3C and 4A-4F are graphical representations illustrating rheology tests using a rheometer with parallel plate, where the flow ramp shows that varied flow behavior of emulsion is dependent on the concentration of the thickening agent and the ability to increase the viscosity of the emulsion without compromising its fluid flow behavior. Flow rate indices, using the Sisko model, confirmed the behavior of the emulsion under shear force, showing an increasingly shear thinning behavior as the concentration of CNC increases, hence suitability to be extruded by spray nozzle with formulation system of agrochemicals on crops. The rheological analyses of the emulsion through the investigation of their flow behavior in the presence of Alg (0.25%, 0.5%, 1%) and $Ca^{2+}$ was measured (FIGS. 3A-3C). All samples demonstrated shear thinning behavior, with increased viscosity and stable emulsion droplets as the concentration of Alg increased. The contribution of the long and flexible chain of Alg, as well as its H-bond interaction with adjacent hydroxyl-rich CNCs, was responsible for the increase in viscosity. As shown in FIGS. 4A-4F, a similar trend was observed when pristine sulfonated CNCs were used at different concentrations of the ionic crosslinkers ($Mg^{2+}$ and $Zn^{2+}$). These rheological findings are relevant to the use of CNC to form an emulsion that is useful to produce efficient agrochemical formulations that are easy to spray with existing nozzle spray technologies. As CNC adsorption at the water/oil interface facilities the formation of stable emulsion and depending on the concentration of CNC and ionic crosslinkers, the droplet size and the fluid flow behavior can be tuned.

Figure 5:
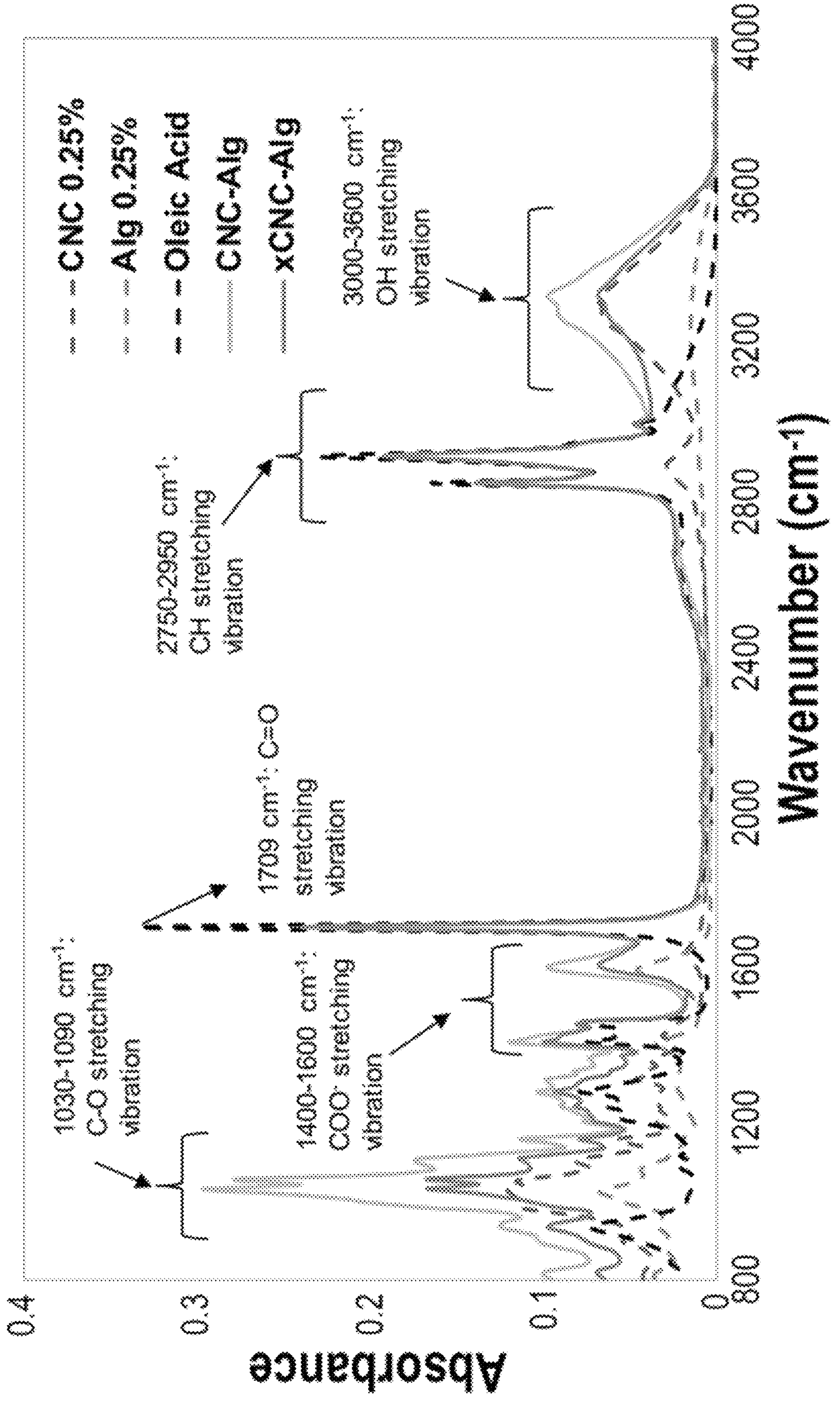
FIG. 5 is a graphical representation of a Fourier transform infrared measurements showing that the modification process via crosslinking has led to the reduction of hydroxyl (—OH) groups in the crosslinked (x) cellulose nanocrystal backbone. The decrease of band intensities at 3000-3600 $cm^{-1}$, 1400-1600 $cm^{-1}$ and 1030-1090 $cm^{-1}$ confirmed the interaction of $Ca^{2+}$ with carboxyl, carbonyl, and hydroxyl groups.

FIG. 5 is a graphical representation of a Fourier transform infrared measurements showing that the modification process via crosslinking has led to the reduction of hydroxyl (—OH) groups in the crosslinked (x) cellulose nanocrystal backbone. The decrease of band intensities at 3000-3600 $cm^{-1}$, 1400-1600 $cm^{-1}$ and 1030-1090 $cm^{-1}$ confirmed the interaction of $Ca^{2+}$ with carboxyl, carbonyl, and hydroxyl groups.

Figure 6A:
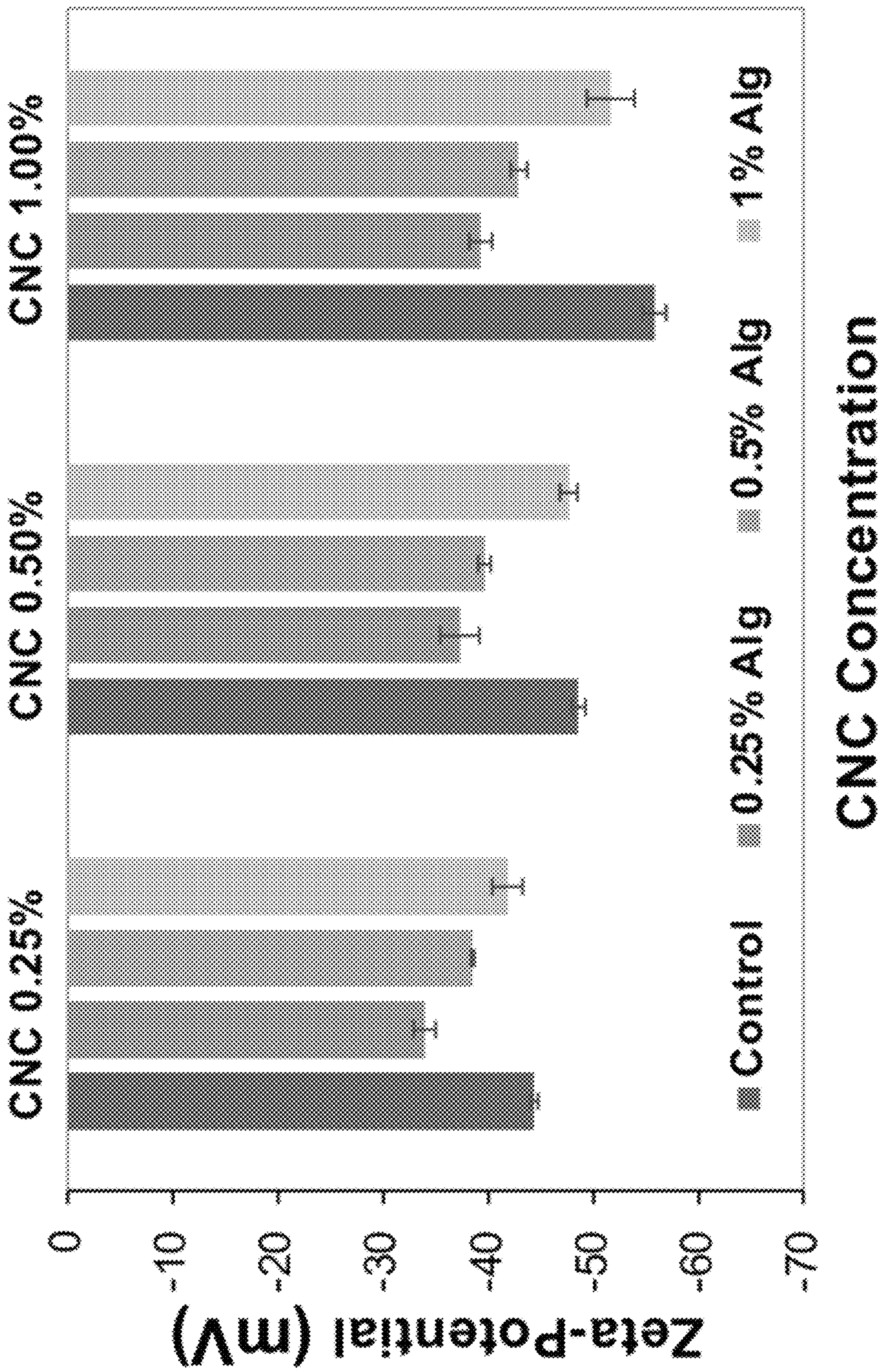
FIG. 6A is a graphical representation of the zeta-potential of cellulose nanocrystal-based emulsions with increasing alginate concentrations (0.25%, 0.50%, and 1.00% Alg).
Figure 6B:
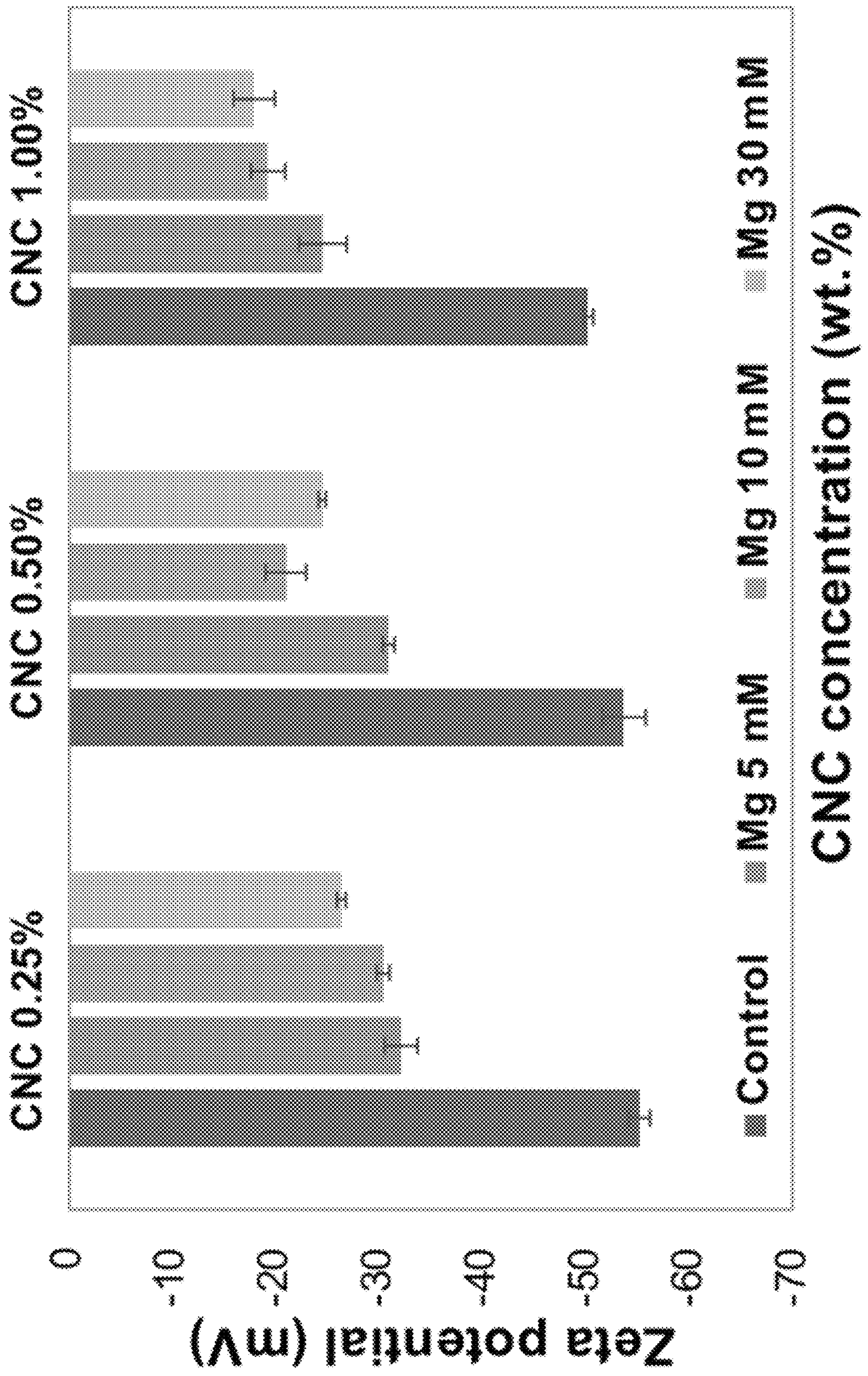
FIG. 6B is a graphical representation of the zeta-potential of cellulose nanocrystal-based emulsions with increasing alginate concentrations (0.25%, 0.50%, and 1.00% Alg) and increasing cationic crosslinker concentration (5, 10, and 30 mM $Mg^{2+}$).
Figure 6C:
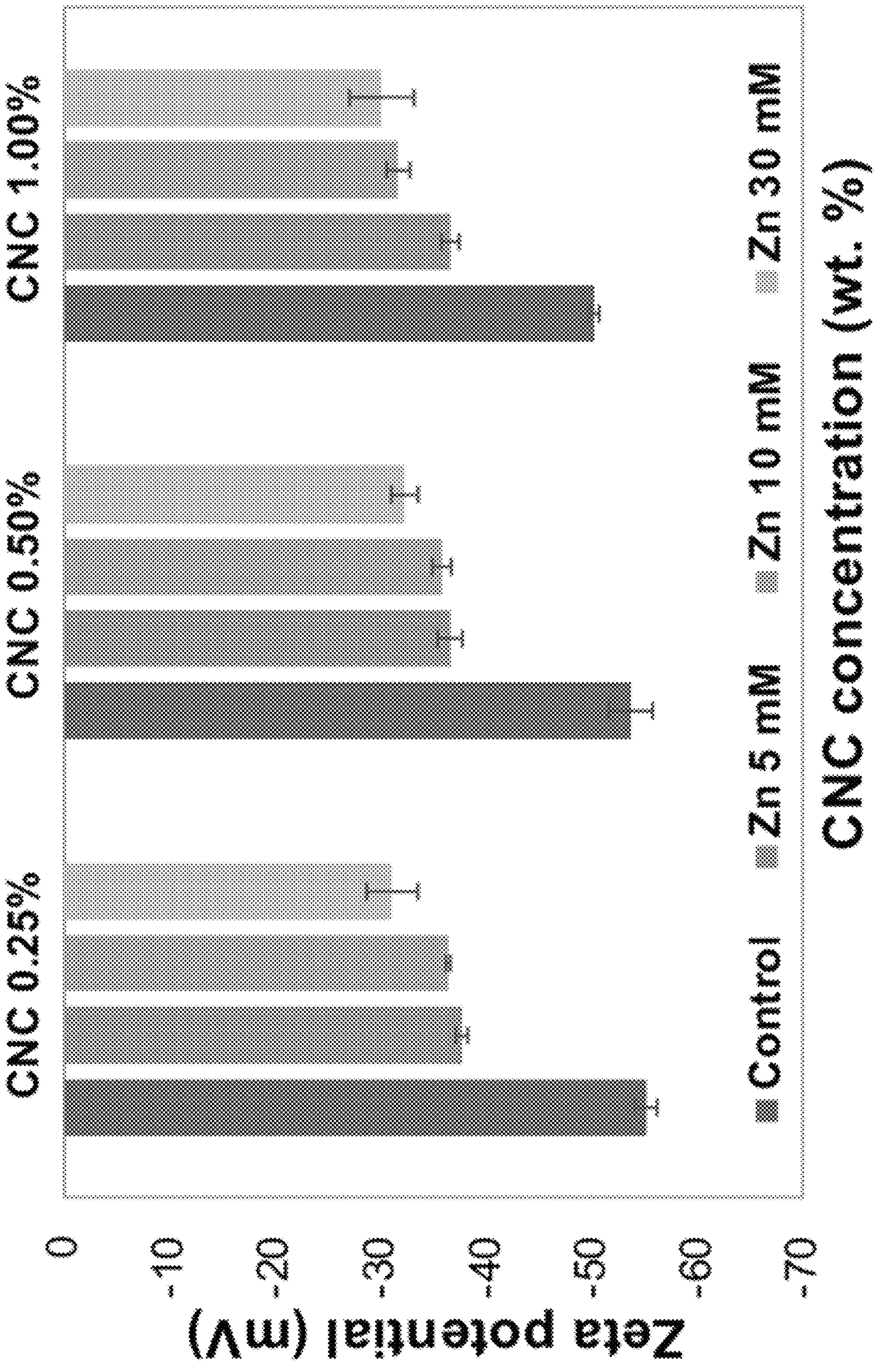
FIG. 6C is a graphical representation of the zeta-potential of cellulose nanocrystal-based emulsions with increasing alginate concentrations (0.25%, 0.50%, and 1.00% Alg) and increasing cationic crosslinker concentration (5, 10, and 30 mM $Zn^{2+}$).

FIGS. 6A-6C show the zeta-potential of the emulsion droplets, indicating surface charge, for increasing concentrations of CNC, alginate (FIG. 6A), and ionic crosslinkers (FIGS. 6B and 6C). At each CNC concentration (0.25%, 0.5%, 1% w/w), the zeta-potential of the emulsion droplets was lower than that of the respective controls (CNC only), indicating crosslinking effect between negatively charged CNCs and Alg, and positively charged ionic crosslinkers. For the emulsions, zeta-potential increased as Alg concentration increased, indicating improved emulsion stability with the addition of Alg. This surface charge variability is expected since alginate is a negatively charged polysaccharide. Similarly, at each CNC concentration (0.25%, 0.5%, 1% w/w), zeta-potential of the emulsions was significantly lower than that of the respective controls (CNC only), indicating the same crosslinking effect which is even more pronounced with increasing ionic crosslinker concentrations.

Figure 7:
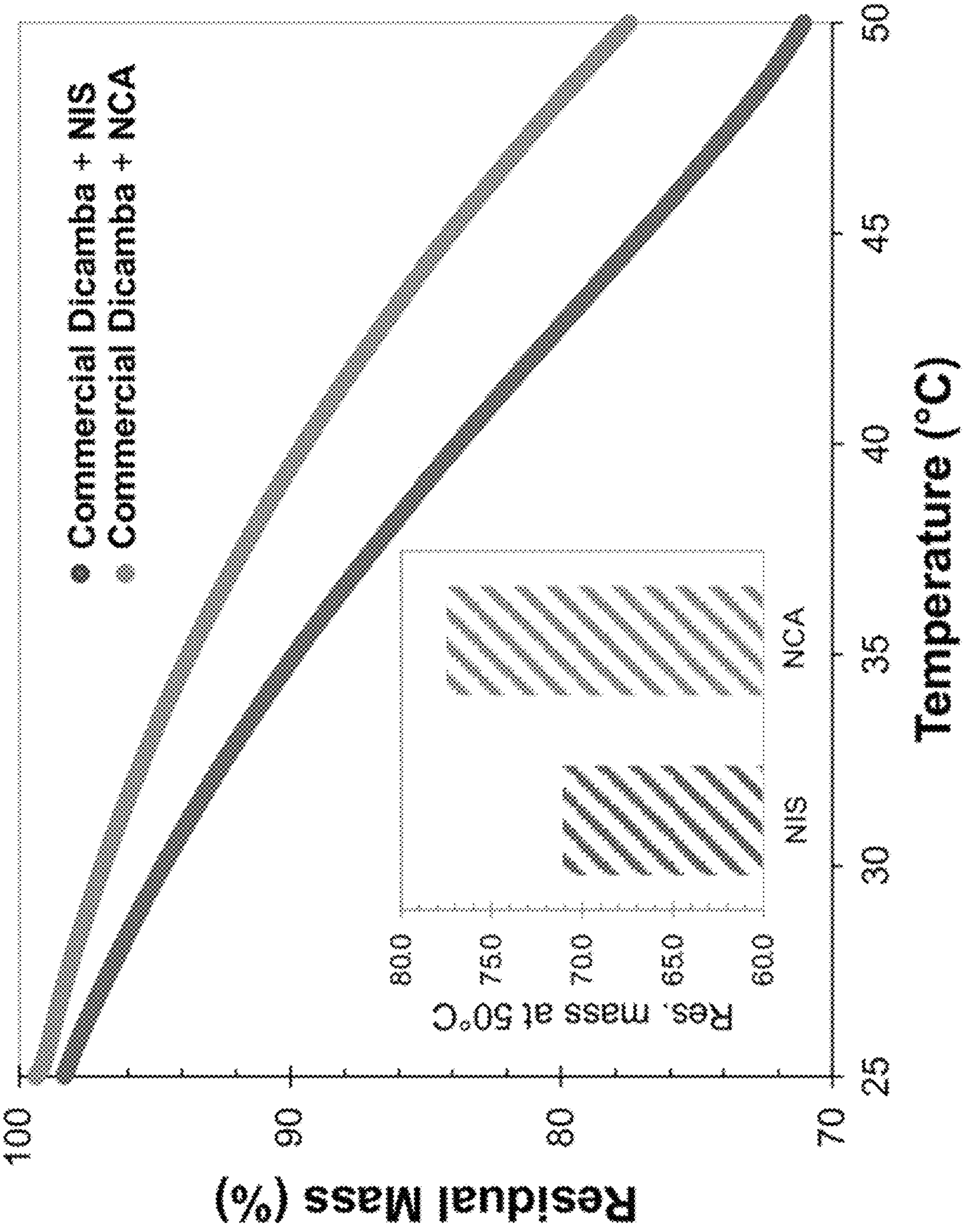
FIG. 7 is a graphical representation of the thermal gravimetric analysis of a commercial dicamba formulation mixed with a commercial non-ionic surfactant (NIS) vs cellulose nanocrystal-based adjuvant (NCA) in the temperature range of 25-50° C.

FIG. 7 shows the thermal degradation (TGA) profile of a commercial dicamba formulation, when mixed with non-ionic surfactant (NIS) vs nanocellulose adjuvant (NCA), in the ratio of 3.5:1 v/v. The mass loss rate was monitored in the temperature range of 25-50° C., as this is the most relevant range that farmers typically encounter during farming operations involving herbicide application. Overall, it was observed that volatility of dicamba increased as temperature increased from 25 to 50° C. However, the mass loss rate was lower in the case of dicamba+NCA (76.8% residual mass at 50° C.), compared to dicamba+NIS (71.1% residual mass at 50° C.), indicating lower volatilization potential of dicamba, when mixed with NCA.

Figure 8A:
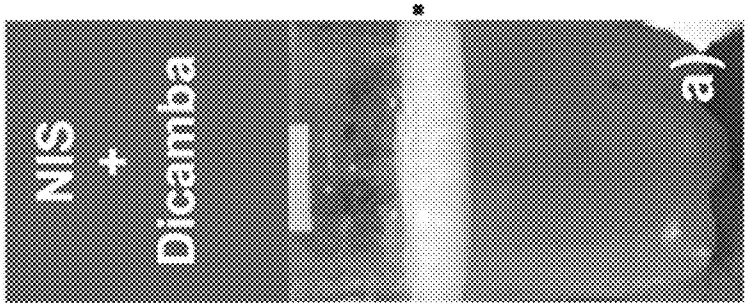
FIG. 8A is a graphical representation of the defoaming potential of NIS during dicamba spray mix preparation.
Figure 8B:
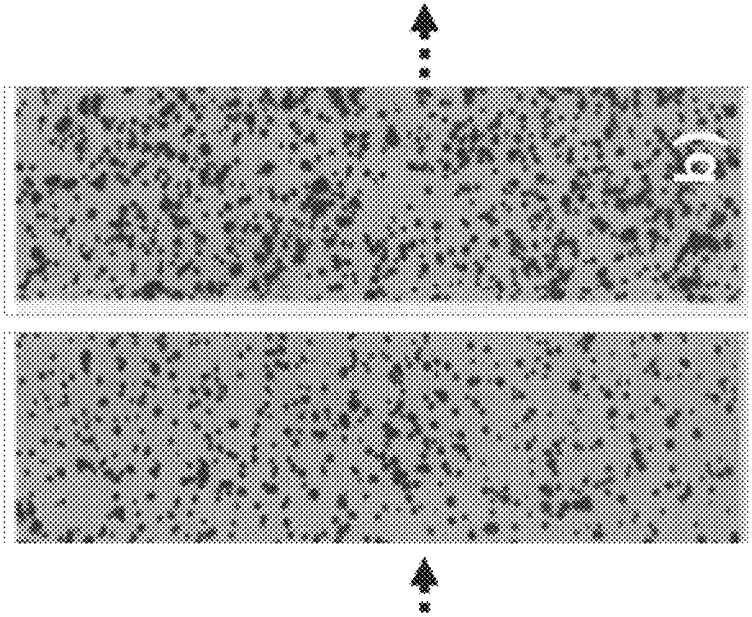
FIG. 8B is a graphical representation of the droplet size distribution of the spray mixture captured on water sensitive paper showing medium-to-coarse volume median diameter (VMD) droplet size as per ASABE S572.1 classification.
Figure 8C:
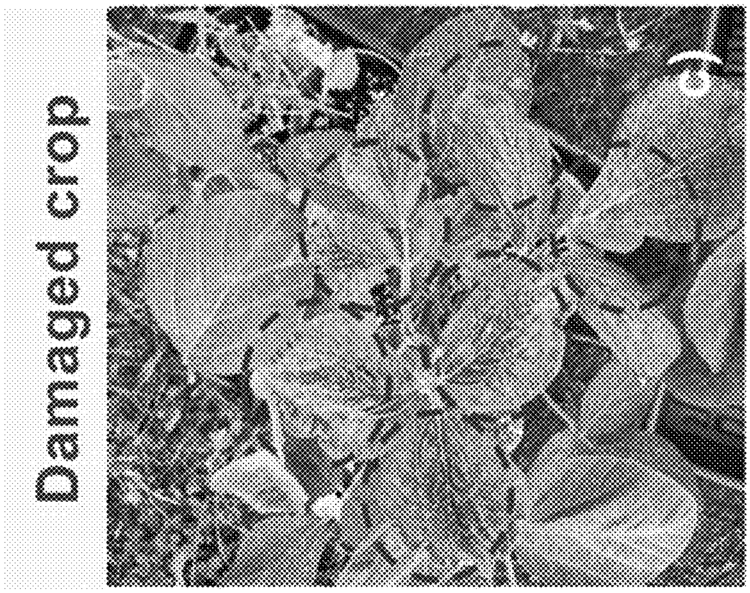
FIG. 8C is an annotated image of soybean leaves sprayed with dicamba-NIS showing damaged crops for NIS.
Figure 8D:
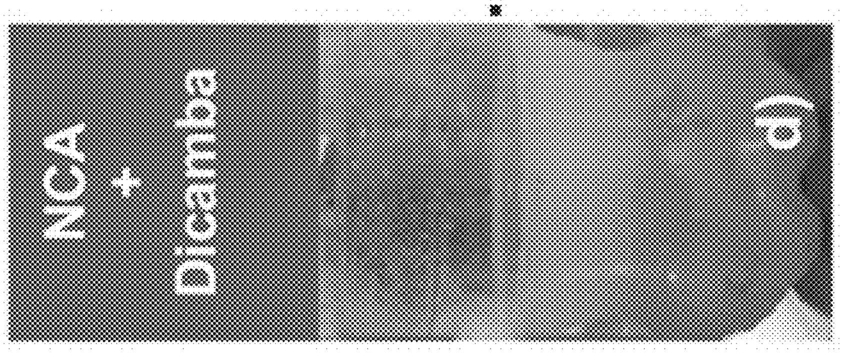
FIG. 8D is a graphical representation of the defoaming potential of NCA during dicamba spray mix preparation.
Figure 8E:
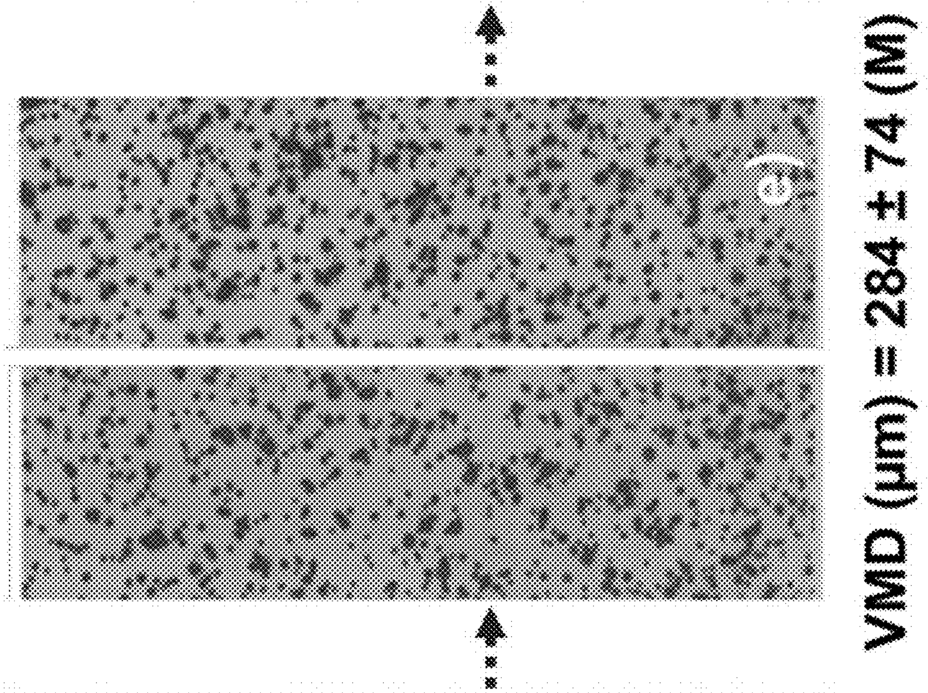
FIG. 8E is a graphical representation of the droplet size distribution of the spray mixture captured on water sensitive paper showing medium-to-coarse VMD droplet size as per ASABE S572.1 classification.
Figure 8F:
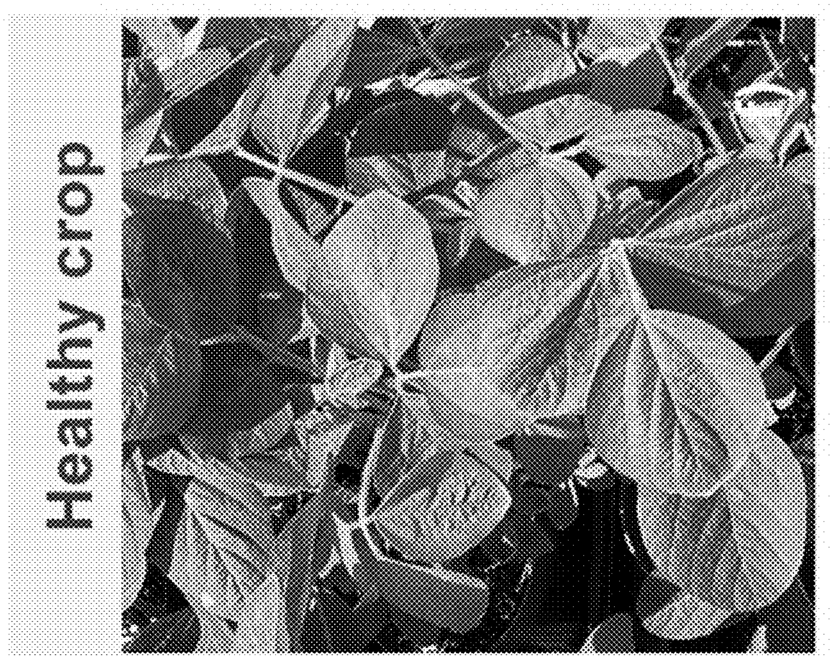
FIG. 8F is an annotated image of soybean leaves sprayed with dicamba-NCA showing healthy crops for NCA.

FIGS. 8A-8F show the defoaming capability of NCA, compared to NIS (FIGS. 8A and 8D), during dicamba spray mixture preparation; the adjuvant was added at the standard concentration of 0.25% v/v. TTI-02 tip nozzles from Turbo TeeJet® Technologies were used for herbicide application at 10 GPA in a spray chamber and spray droplets were captured on water sensitive paper (FIGS. 8B and 8E). The droplet size distribution was analyzed using ImageJ software and the resulting volume median diameter (VMD) values are reported here. The average VMD value of the two spray mixtures were quite similar (no difference at $p<0.05$) and as per ASABE classification S572.1, the VMD values were in the "medium" (225-325 μm) droplet size category, indicating similar particle drift potential of the two mixtures. Lastly, field trials conducted on conventional (dicamba-intolerant) soybeans showed severe drift symptomology (wrinkling and curling of leaves) in the case of dicamba+NIS and healthy soybean leaves in the case of dicamba+NCA (FIGS. 8C and 8F). These pictures were taken 14 days after treatment (DAT), where each treatment consisted of exposing potted soybeans to trays containing dicamba-sprayed sand for 72 h. Overall, commercial dicamba, NCA provided vapor drift and defoaming benefits to commercial dicamba, without compromising on the particle driftability of the agrochemical formulation.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Systems and processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method for treating a crop with an agricultural product, the method comprising the steps of incorporating a cellulose nanocrystal-based emulsion into an agrochemical to produce the agricultural product, and applying said agricultural product to said crop; wherein said cellulose nanocrystal-based emulsion comprises:

a continuous aqueous phase, comprising:

between about 0.25% and about 3% (w/w) of sulfonated cellulose nanocrystals;

between about 0.25% and about 1% (w/w) of co-stabilizing biopolymer; and up to about 3.0% (w/w) of cationic crosslinker; and a dispersed oil phase comprising a plant-based oil.

2. The method of claim 1, wherein said step of incorporating the cellulose nanocrystal-based emulsion into the agrochemical comprises mixing the cellulose nanocrystal-based emulsion and the agrochemical in the preparation of a tank mix or a spray mix.

3. The method of claim 1, wherein said step of incorporating the cellulose nanocrystal-based emulsion into the agrochemical comprises applying the cellulose nanocrystal-based emulsion to a formulation of the agrochemical.

4. The method of claim 1, wherein said cellulose nanocrystal-based emulsion has an aqueous phase-to-oil phase ratio of between about 70:30 v/v and about 90:10 v/v.

5. The method of claim 1, wherein the agrochemical is a fungicide, an insecticide, an herbicide, or a combination thereof.

6. The method of claim 5, wherein the herbicide is dicamba.

7. The method of claim 1, wherein said co-stabilizing biopolymer is alginate, chitosan, starch, derivatized cellulose, collagen, lignin, hydroxyapatite, cyclodextrin, guar gum, carrageenan, silk, or a combination thereof.

8. The method of claim 1, wherein said cationic crosslinker is a cationic salt comprising divalent or trivalent cations.

9. The method of claim 8, wherein the cationic salt comprising divalent or trivalent cations is a salt containing $Mg^{2+}$ cations or $Zn^{2+}$ cations.

10. The method of claim 1, wherein said plant-based oil is oleic acid, methylated seed oil, essential oils, sunflower oil, coconut oil, canola oil, neem oil, soybean oil, cottonseed oil, or a combination thereof.

11. The method of claim 10, wherein said plant-based oil is oleic acid or methylated seed oil.

12. The method of claim 1, wherein the co-stabilizing biopolymer is alginate, the cationic crosslinker is calcium chloride, and the plant-based oil is oleic acid.

13. The method of claim 1, wherein the co-stabilizing biopolymer is guar gum, the cationic crosslinker is a salt containing $Mg^{2+}$ cations, and the plant-based oil is methylated seed oil.

14. The method of claim 1, wherein the step of applying said agricultural product to said crop comprises applying said agricultural product to said crop as droplets having a diameter between 210 μm and 358 μm.

* * * * *